US012800840B2

(12) United States Patent
Witzens et al.

(10) Patent No.: US 12,800,840 B2
(45) Date of Patent: Nov. 17, 2026

(54) PHOTONIC INTERPOSER, A PHOTONIC ARRANGEMENT AND A METHOD FOR MANUFACTURING A PHOTONIC INTERPOSER

(71) Applicant: Rheinisch-Westfälische Technische Hochschule (RWTH) Aachen, Aachen (DE)

(72) Inventors: Jeremy Witzens, Cologne (DE); Florian Merget, Würselen (DE); Manuel Ackermann, Aachen (DE)

(73) Assignee: Rheinisch-Westfälische Technische Hochschule (RWTH) Aachen, Aachen (DE)

( * ) Notice: Subject to any disclaimer, the term of this patent is extended or adjusted under 35 U.S.C. 154(b) by 202 days.

(21) Appl. No.: 18/564,820

(22) PCT Filed: May 31, 2021

(86) PCT No.: PCT/EP2021/064553

§ 371 (c)(1),
(2) Date: Nov. 28, 2023

(87) PCT Pub. No.: WO2022/253405

PCT Pub. Date: Dec. 8, 2022

(65) Prior Publication Data

US 2024/0264380 A1 Aug. 8, 2024

(51) Int. Cl.
*G02B 6/30* (2006.01)
*G02B 6/27* (2006.01)

(52) U.S. Cl.
CPC ............. *G02B 6/30* (2013.01); *G02B 6/2706* (2013.01)

(58) Field of Classification Search
CPC ......... G02B 6/2706; G02B 6/30; G02B 6/272
See application file for complete search history.

(56) References Cited

U.S. PATENT DOCUMENTS 12,339,498 B2 * 6/2025 Witzens ............... G02B 6/4246
2006/0044650 A1 3/2006 Du et al.
(Continued)

FOREIGN PATENT DOCUMENTS

| | | | |
|---|---|---|---|
| CN | 106464383 | A | 2/2017 |
| CN | 111279236 | A | 6/2020 |
| WO | 2021170200 | A1 | 9/2021 |

OTHER PUBLICATIONS

International Search Report for PCT/EP2021/064553 mailed Feb. 7, 2022. 3 pages.

(Continued)

*Primary Examiner* — Eric Wong
(74) *Attorney, Agent, or Firm* — Lerner David LLP

(57) ABSTRACT

The invention relates to a photonic interposer (300) for coupling light between a first optical fiber (200I) and a photonic integrated circuit (100) and between the photonic integrated circuit (100) and a second optical fiber (200O), the photonic interposer (300) comprising a polarization selective beam splitter-/combiner (310) adapted to split an input light beam (400CI) with first and second polarizations, from the first optical fiber (200I), into a first light beam (400AI) and a second light beam (400BI) and to redirect one of the first and second light beams (400AI, 400BI), and the first light beam (400AI) has the first polarization and the second light beam (400BI) has the second polarization which is different from the first polarization; and the polarization selective beam splitter-/combiner (310) is adapted to combine modulated first and second light beams (400AO, 400BO) from the photonic integrated circuit (100) into a combined light beam (400CO) to be coupled to the second optical fiber (220O), and the modulated first and second light beams (400AO, 400BO) are respectively subject to the first
(Continued)

Figure 1A:
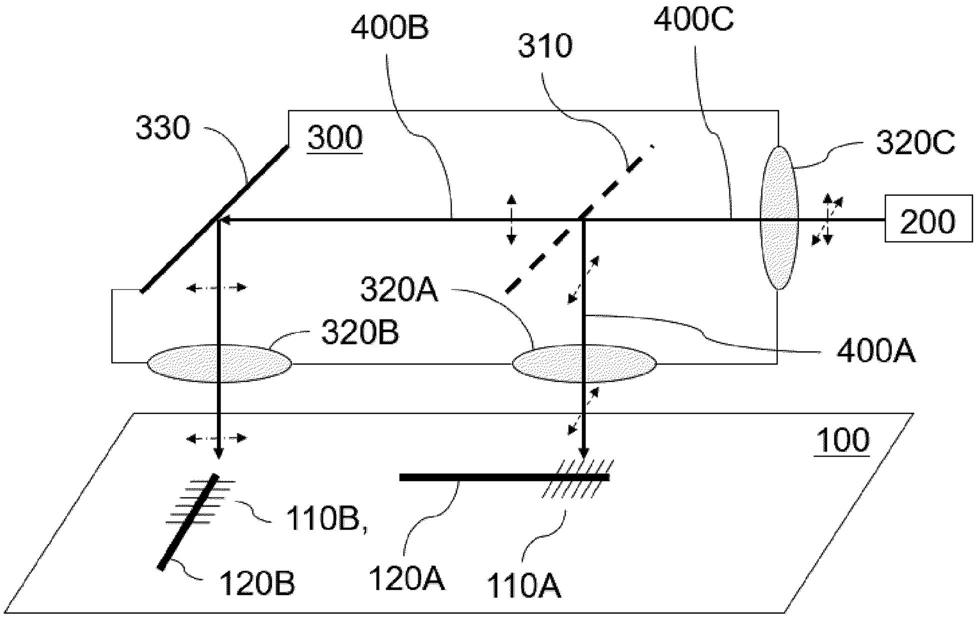
Figure 1B:
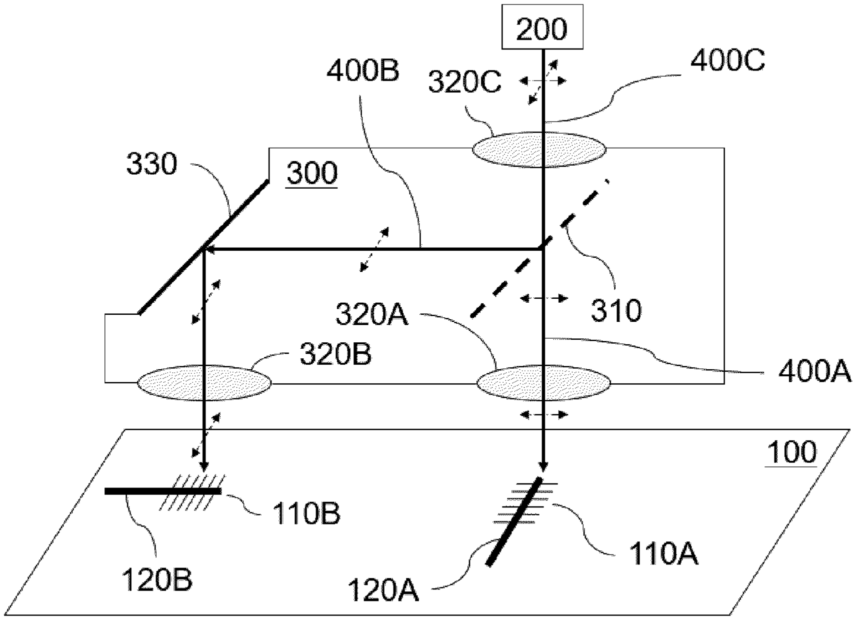
Figure 1C:
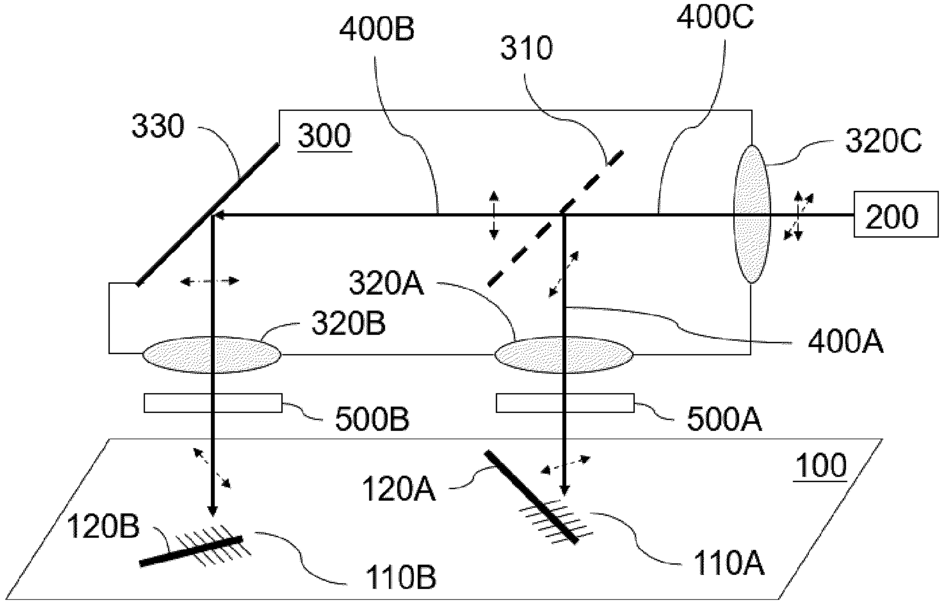
Figure 1D:
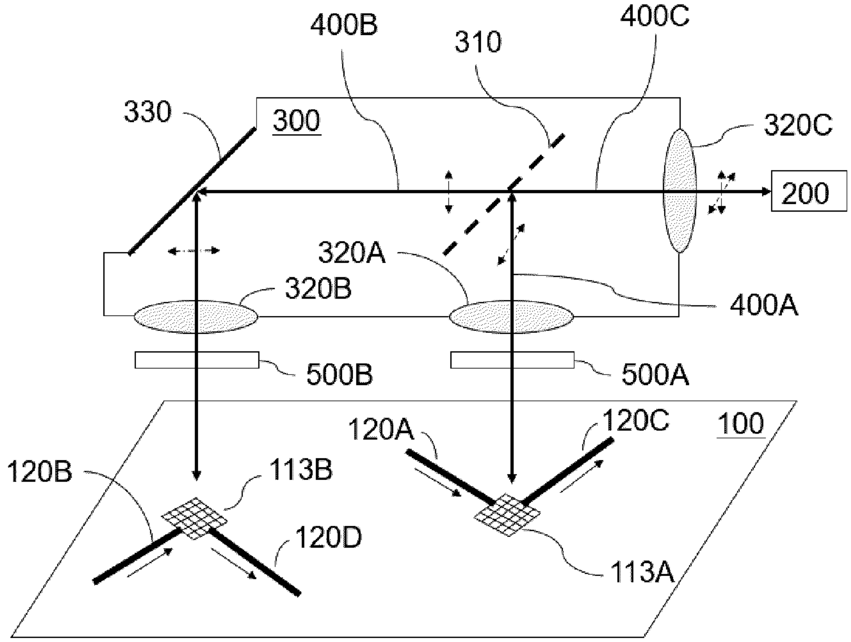
Figure 2A:
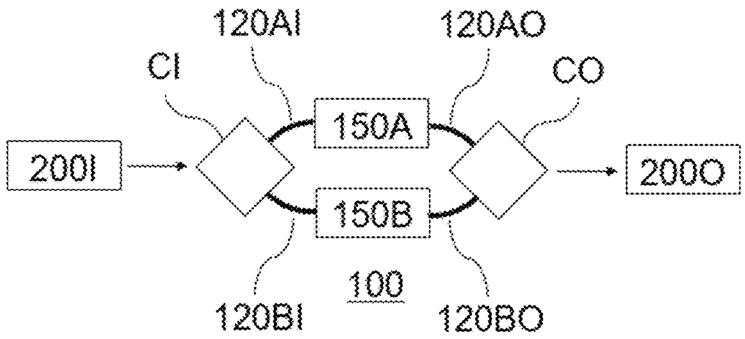
Figure 2B:
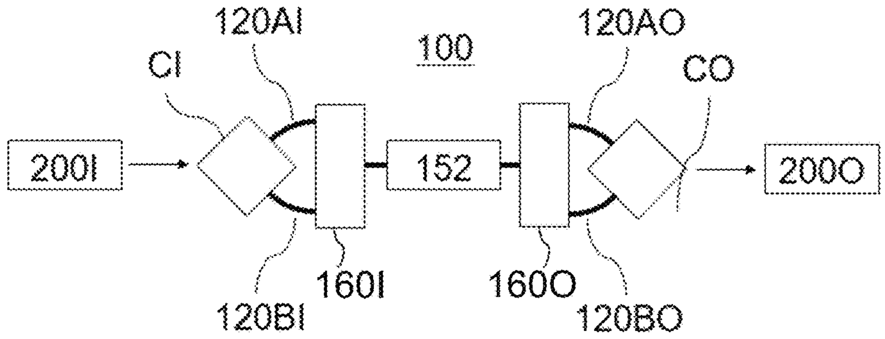
Figure 2C:
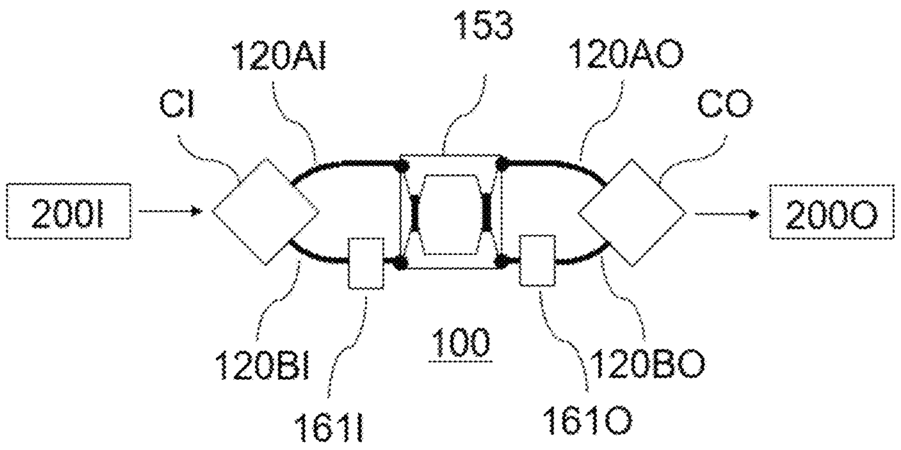
Figure 2D:
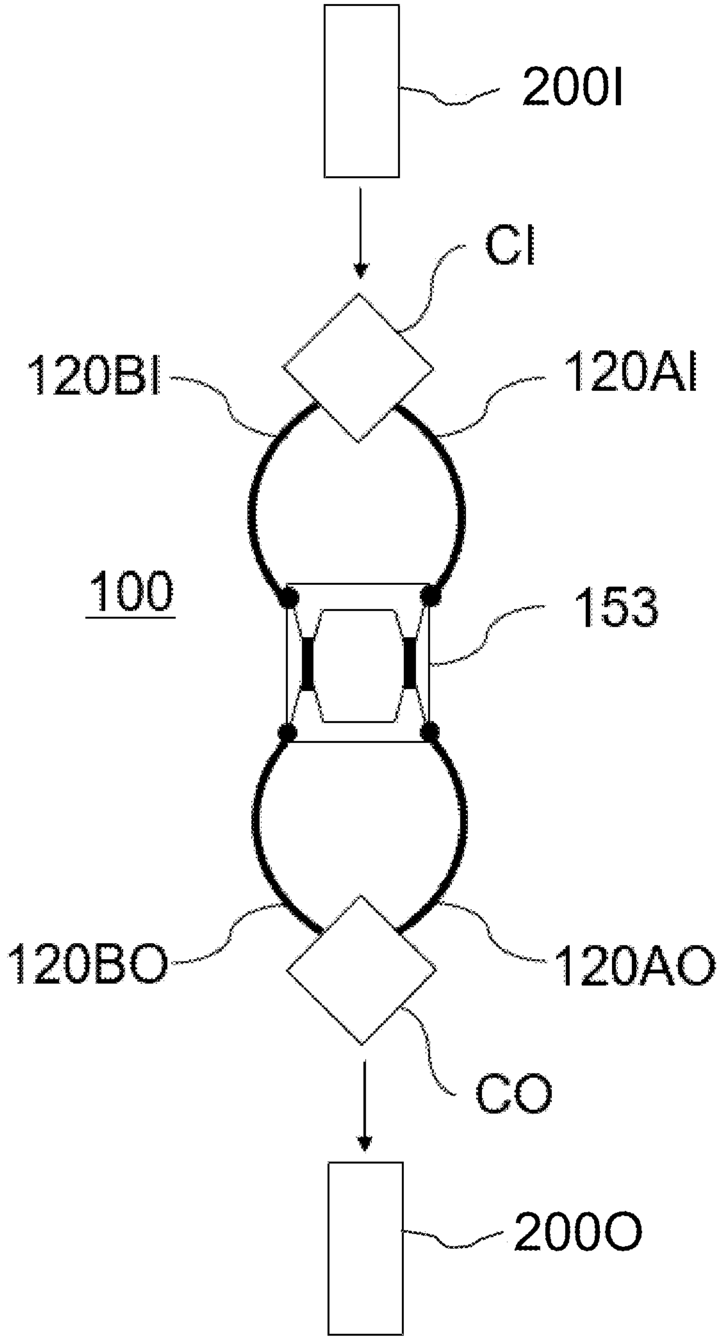

and second light beams (400AI, 400BI) being modulated by a same data stream, by the photonic integrated circuit (100).

19 Claims, 19 Drawing Sheets

(56) References Cited

U.S. PATENT DOCUMENTS

| | | | | |
|---|---|---|---|---|
| 2017/0019181 | A1* | 1/2017 | Flintham | G02B 6/4213 |
| 2019/0115995 | A1* | 4/2019 | Sahni | G02B 6/272 |
| 2020/0371370 | A1* | 11/2020 | Ouderkirk | G02B 5/3016 |
| 2022/0187631 | A1* | 6/2022 | Jang | G02F 1/1396 |
| 2023/0152537 | A1* | 5/2023 | Witzens | G02B 6/2773 385/33 |

OTHER PUBLICATIONS

Search Report dated May 16, 2026 from the Office Action for Chinese Application No. 202180098877.7 issued May 22, 2026, pp. 1-2.

* cited by examiner

PHOTONIC INTERPOSER, A PHOTONIC ARRANGEMENT AND A METHOD FOR MANUFACTURING A PHOTONIC INTERPOSER

CROSS-REFERENCE TO RELATED APPLICATION

This application is a national phase entry under 35 U.S.C. § 371 of International Application No. PCT/EP2021/064553, filed May 31, 2021, the entire disclosure of which is incorporated herein by reference.

The invention relates to concepts for co-packaged optics and applications thereof and in particular to a photonic interposer, a photonic arrangement with the photonic interposer and a method for manufacturing a photonic interposer and/or a photonic arrangement.

Assembly and packaging make up between 30% and 90% of the total manufacturing cost of electro-optical transceivers and present a major challenge for cost reduction and scalability. Such challenges are further exacerbated by co-packaged optics, i.e., the co-integration of electronic switch chips, processors, FPGAs or other electronic data processing units with electro-optical transceivers in a common package.

Additional micro-optics incorporated into the package can serve to increase the density of fibers that can be coupled to a photonic integrated circuit, also referred herein as chip, as well as to manage polarization diversity of incoming or outgoing light. In order to reduce the manufacturing cost of such micro-optics, it is advantageous to fabricate them in parallel, for example by molding arrays of such elements into a glass wafer with high precision isothermal or higher throughput non-isothermal glass molding processes, see for example M. Hünten, F. Klocke, O. Dambon, "Precision glass molding: an integrative approach for the production of high precision micro-optics," in Proc. SPIE, vol. 7591, Art. ID 75910X, 2010, which is incorporated by reference herein in its entirety. A glass wafer can also be called a glass plate. Such micro-optics can for example comprise lenses for forming a light beam coupled between the photonic integrated circuit and an optical fiber as well as reflective surfaces to route the light. Such surfaces can also be made to be selectively reflective by e.g. micro-structuring or applying thin film coatings, such that they only reflect certain polarizations and/or wavelengths and let the remaining light pass through. A typical thin-film coating for splitting polarizations can for example be configured in the MacNeille configuration. Since it is advantageous to define such treated surfaces inside the micro-optics, with materials of identical or similar refractive indices on both sides of the surface, such a micro-optics may be composed of several glass-molded building blocks, one or several of which have been surface treated prior to being assembled with each other, such that treated surfaces may end up being an internal interface inside the assembled micro-optics. These micro-optics are also referred to as photonic interposers in this disclosure.

US 2019/0243164 A1 discloses a system comprising a first integrated circuit in a first-level package, wherein the first integrated circuit is a packet-switching digital integrated circuit; and an optical engine, in the first-level package, the optical engine comprising a first electro-optical chip comprising a photodetector.

There may be a demand to provide concepts for enhancing such a system, and more specifically improving systems with co-packaged optics. Further, small devices may be desirable. In particular, small devices lead to shorter electrical traces between electronic and optical signal processing elements and further to reduced signal distortion and attenuation. This in turn allows for a reduction of electrical power consumption.

Such a demand may be satisfied by the subject-matter of the independent claims.

Specifically, such a demand may be satisfied by a photonic interposer for coupling light between a first optical fiber and a photonic integrated circuit and between the photonic integrated circuit and a second optical fiber. Specifically, the photonic interposer may be adapted for use in co-packaged optics. The photonic interposer comprises a polarization selective beam splitter-/combiner. The polarization selective beam splitter-/combiner is adapted to split an input light beam with first and second polarizations into a first light beam and a second light beam. The input light beam is emitted from the first optical fiber. The polarization selective beam splitter-/combiner is adapted to redirect one of the first and second light beams, in particular the second light beam. The first light beam has the first polarization. The second light beam has the second polarization. The first and second polarizations differ from one another. The (same) polarization selective beam splitter-/combiner is adapted to combine modulated first and second light beams from the photonic integrated circuit into a combined light beam. The polarization selective beam splitter-/combiner for splitting the input light beam and combining the modulated first and second light beams may be one and the same polarization selective beam splitter-/combiner. The combined light beam is intended to be coupled to the second optical fiber. The combined light beam may have the first and second polarizations. Further, the modulated first and second light beams are respectively subject to (or correspond to or are dependent from) the first and second light beams being modulated by a same data stream. The same data stream may be understood as an identical data stream. The first and second light beams are being modulated according to the same data stream by the photonic integrated circuit. Specifically, this modulation may take place at the photonic integrated circuit and the modulated light signals may be received back by the photonic interposer.

In consequence, a size of the interposer may be reduced.

Each of the light beams referred to herein may be understood as light beams at a predetermined wavelength or at a group of predetermined wavelengths, such as a first and second predetermined wavelength, for which wavelength(s) at least part of the photonic integrated circuit, the photonic interposer and/or the elements/components of the photonic integrated circuit and the photonic interposer as disclosed herein are adapted to.

Particularly advantageous configurations can be found in the dependent claims.

The photonic interposer may comprise a plurality of reflectors. The plurality of reflectors may be adapted to totally reflect light. The plurality of reflectors may be arranged in a same layer. The plurality of reflectors and the polarization selective beam splitter-/combiner may be arranged in the same layer. The plurality of reflectors and the polarization selective beam splitter-/combiner may be arranged at a same (horizontal) plane. The plurality of reflectors and the polarization selective beam splitter-/combiner may be arranged at a same angle. For example, the plurality of reflectors and the polarization selective beam splitter-/combiner may have a same alignment with respect to each other. The polarization selective beam splitter-/combiner may be arranged in a light path between the plurality of reflectors.

Consequently, an easier implementation may be achieved.

A layer may comprise or consist of a glass building block manufactured by forming a glass preform such as a glass plate. The layer may be formed by means of a single glass molding step followed by a local deposition of thin film coatings. Such layers may be stacked on top of each other or next to each other to form an interposer. Selective beam splitter-/combiner or reflectors formed at either of the surfaces of two layers of glass building blocks where these two layers of glass building blocks are attached to each other may form a layer of selective beam splitter-/combiners and reflectors.

The plurality of reflectors may comprise first and second reflectors. A distance between the first reflector and the polarization selective beam splitter-/combiner may essentially be the same as a distance between the second reflector and the polarization selective beam splitter-/combiner. The plurality of reflectors may be arranged parallelly. Further, the plurality of reflectors may be equidistant to each other. Moreover, the polarization selective beam splitter-/combiner and each of the plurality of reflectors may be equidistant to each other.

This may lead to a simplified photonic interposer structure.

The photonic interposer may comprise a plurality of lenses. The plurality of lenses may have first and second lenses. The first and second lenses may be adapted to respectively couple the first and second light beams from the photonic interposer to the photonic integrated circuit. The plurality of lenses and the polarization selective beam splitter-/combiner may be arranged such that all light paths within the photonic interposer cross the polarization selective beam splitter-/combiner. The plurality of lenses and the polarization selective beam splitter-/combiner may be further arranged such that all light paths of a preselected wavelength within the photonic interposer cross the polarization selective beam splitter-/combiner.

The first and second lenses may be adapted to respectively couple the modulated first and second light beams from the photonic integrated circuit to the photonic interposer.

The plurality of lenses may be adapted to form or may form respective interfaces between the photonic interposer and the optical fibers, and/or between the photonic interposer and the photonic integrated circuit. The respective interfaces may be understood as input and/or output ports of the photonic interposer.

Hence, a simpler photonic interposer structure may be provided.

The plurality of lenses may have third and fourth lenses. The third lens may be adapted to operate as input port of the photonic interposer. The fourth lens may be adapted to operate as output port of the photonic interposer. Thus, the third lens may be an input port of the photonic interposer. The fourth lens may be an output port of the photonic interposer. Further, the first and second lenses may be input-output ports of the photonic interposer. In consequence, a light path from the first optical fiber to the photonic integrated circuit may be defined by a path starting from the optical fiber and passing the third lens (as input port) towards the polarization selective beam splitter-/combiner branching into a first branching path towards the first lens (as input/output port) and into a second branching path towards, in the following order, the first reflector and the second lens (as input/output port). In a further consequence, the light path from the photonic integrated circuit to the second optical fiber may be defined by a first branching path starting from the photonic integrated circuit and passing the first lens (as input/output port) towards the polarization selective beam splitter-/combiner and by a second branching path starting from the photonic integrated circuit and passing, in the following order, the second lens (as input/output port), the first reflector towards the polarization selective beam splitter-/combiner, where the first and second branching paths combine to another path passing, in the following order, the second reflector and the third lens (as output port). Alternatively, the second reflector may not be part of the light path from the photonic integrated circuit to the second fiber, but rather be part of the light path from the first fiber to the photonic integrated circuit. In this case the light from the first fiber may pass the second reflector before reaching the polarization selective beam splitter-/combiner.

The first and second lenses, and the third and fourth lenses may be arranged opposite to each other, for example at opposite sides of the photonic interposer.

The first lens and the second lens may be spaced apart the same as the third lens and the fourth lens. The first lens and the third lens may have one and the same central axis. A central axis of the second lens may differ from a central axis of the fourth lens. The central axis of the second lens and the central axis of the first and third lenses may be equidistant to each other. The central axis of the fourth lens and the central axis of the first and third lenses may be equidistant to each other.

That is, a smaller sized package may be achieved.

The photonic interposer may comprise first and second Faraday rotators. The first and second Faraday rotators may be adapted to adjust the respective polarization of the first and second light beams, for example to an alignment of respective couplers of the photonic integrated circuit. The couplers may be grating couplers, for example polarization splitting grating couplers. The first Faraday rotator may be adapted to couple the first light beam with the adjusted polarization of the first light beam between the first lens and a first coupler of the photonic integrated circuit, for example a first grating coupler, in particular a first polarization splitting grating coupler. The second Faraday rotator may be adapted to couple the second light beam with the adjusted polarization of the second light beam between the second lens and a second coupler of the photonic integrated circuit, for example a second grating coupler, in particular a second polarization splitting grating coupler. The two Faraday rotators may be attached to each other, for example by being formed by a single piece of garnet. Nevertheless, the first and second light beams may propagate through them at different locations.

The above-mentioned demand is also solved by a photonic arrangement. The photonic arrangement comprises the photonic interposer as described above or at least part of the components of the photonic interposer as described above. Further, the photonic arrangement comprises a photonic integrated circuit. The photonic interposer is arranged (directly) at the photonic integrated circuit to provide a photonic interface between the first optical fiber and the photonic integrated circuit (100) as well as the photonic integrated circuit and the second optical fiber.

The first optical fiber may differ from the second optical fiber. For example, the first optical fiber may be spaced apart from the second optical fiber by the distance between the third and fourth lenses.

The photonic integrated circuit has a plurality of couplers including a first coupler and a second coupler. The first and second couplers are respectively arranged with respect to the first and second lenses of the photonic interposer and to respectively receive the first and second light beams. The photonic integrated circuit is adapted to modulate a same data stream on the first and second light beams.

The photonic integrated circuit may be adapted to transmit the modulated first and second light beams under use of the respective first and second couplers. A polarization of the modulated first beam may correspond to the first polarization or the opposite of the first polarization. A polarization of the modulated second beam may correspond to the second polarization or the opposite of the second polarization.

The first coupler may be adapted to receive the first beam and to emit the modulated first beam at one and the same first polarization, for example the first polarization. The second coupler may be adapted to receive the second beam and to emit the modulated second beam at one and the same second polarization, for example the second polarization.

The first coupler may be adapted to receive the first beam and to emit the modulated first beam at opposite polarizations, for example the first beam at the first polarization and the modulated first beam at the opposite of the first polarization or vice versa. The second coupler may be adapted to receive the second beam and to emit the modulated second beam at opposite polarizations, for example the second beam at the second polarization and the modulated first beam at the opposite of the second polarization or vice versa.

The photonic arrangement may comprise first and second Faraday rotators. The first and second Faraday rotators may be arranged between first and second lenses and the first and second couplers, respectively. The first and second Faraday rotators may be adapted to adjust the polarization of the first and second light beams, respectively. The first and second Faraday rotators may be adapted to couple the first and second light beams with the adjusted polarizations between the first and second lenses and the first and second couplers of the photonic integrated circuit, respectively.

The above-mentioned demand is further solved by a method of manufacturing a photonic interposer as described above. This method may also be directed to manufacturing a photonic arrangement as described above. The method comprises providing a plurality of glass molded building blocks. Further, the method comprises coating at least one of the plurality of glass molded building blocks with thin film coatings that may be wavelength specific thin film coatings. The method further comprises assembling the glass molded building blocks.

Moreover, the above-mentioned demand may be solved by a computer program. For example, the computer program product comprises instructions which, when the program is executed by a computer, cause the computer to carry out the steps of the method as described above.

In addition, the above-mentioned demand may be solved by a computer-readable data carrier. For example, the computer-readable data carrier has stored thereon the computer program as described above.

In other words, the present invention provides polarization management with glass-molded micro-optics (referred to herein as photonic interposer), bidirectional links, and wavelength multiplexing. A packaging scheme for co-packaged optics is provided. Co-packaged optics refer to the co-packaging of electro-optic transceivers with electronics, in particular switch chips for top-of-the-rack, TOR, datacenter switches. Embodiments of the present invention enable increased scalability (large fiber counts) and increased performance (lower optical losses) at a low cost point. The connection of optical fibers to photonic chips and the construction of photonic chips in general pose major challenges. Their costs are between 30 and 70 percent of the total costs. The techniques described herein may simplify the construction of co-packaged optics, make it more scalable (more fibers) and reduce losses. The resulting devices can be manufactured cost-efficiently (and in parallel, in large quantities) by forming glass plates.

In one or more embodiments, co-packaged optics are provided, in which electro-optical data converters are combined with the electronics in one package and the laser outside the package, since semiconductor lasers have to be replaced frequently and their efficiency strongly depends on temperature. However, light with mixed polarization arrives at the data converter. For example, the photonic interposer/arrangement herein is provided to solve the problem of introducing mixed polarization light without providing a modulator for each polarization. Thus, energy consumption may be reduced and scalability increased.

In one or more embodiments, the micro-optical coupling elements, the photonic interposer, are provided together with the photonic integrated circuit or also called photonic chip. The photonic chip may be implemented in such a way that light beams having two polarizations inside the first fiber are passed through the modulator in opposite directions and thus the same data stream is modulated. Therefore, the micro-optical coupling elements may contain e.g. Faraday rotators and polarizations splitters. This may be produced in mass.

Co-packaged optics may have the advantage to get rid of electronic boards between electro-optical converters and the switch chip. This may also eliminate an associated signal attenuation. Since electronics used for regenerating signals requires a lot of power, the cooling of systems without such electronics can be significantly simplified as well as the power consumption significantly reduced (>30%). The photonic interposer/arrangement and the co-packaged optics as described herein may be used in 102 Tb/s switches. Further, the photonic interposer/arrangement and the co-packaged optics may be incorporated or be part of such a switch, for example TOR switch.

Applications of the photonic interposer/arrangement and the co-packaged optics may be data centers, high-performance computing systems, sensor technology and/or signal distribution for phased array antennas, e.g. in 5G NR.

One or more aspect may relate to electro-optical data converters and TOR switches with co-packaged optics. Further applications with integrated photonic chips may be light detection and ranging, LiDAR, optical coherence tomography, OCT, and/or external cavity lasers, ECLs.

Even if some of the aspects described above have been described in reference to the photonic interposer, these aspects may also apply to the method and the photonic arrangement. Likewise, the aspects described above in relation to the photonic arrangement and method thereto may be applicable in a corresponding manner to the photonic interposer.

Figure 3A:
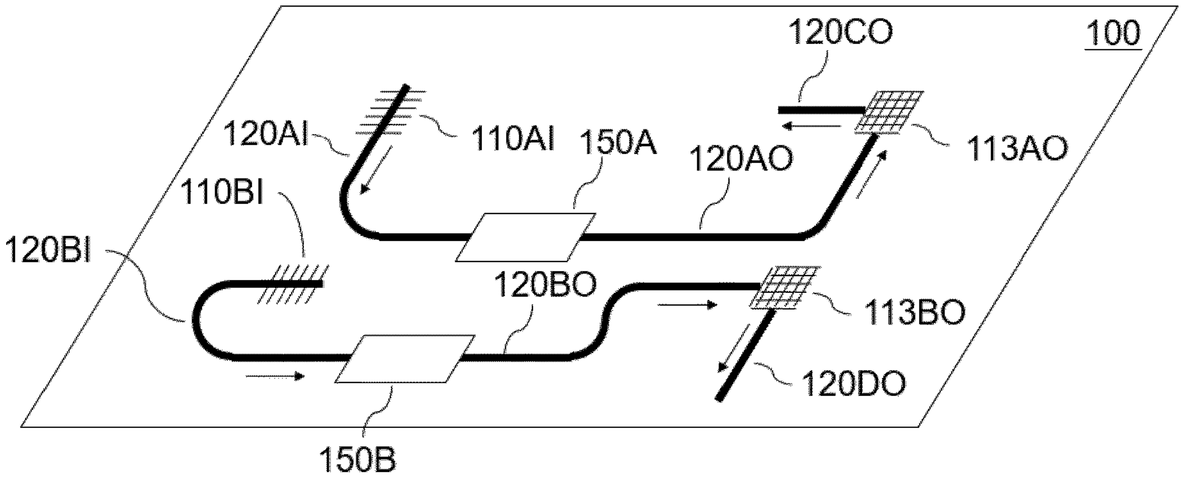
Figure 3B:
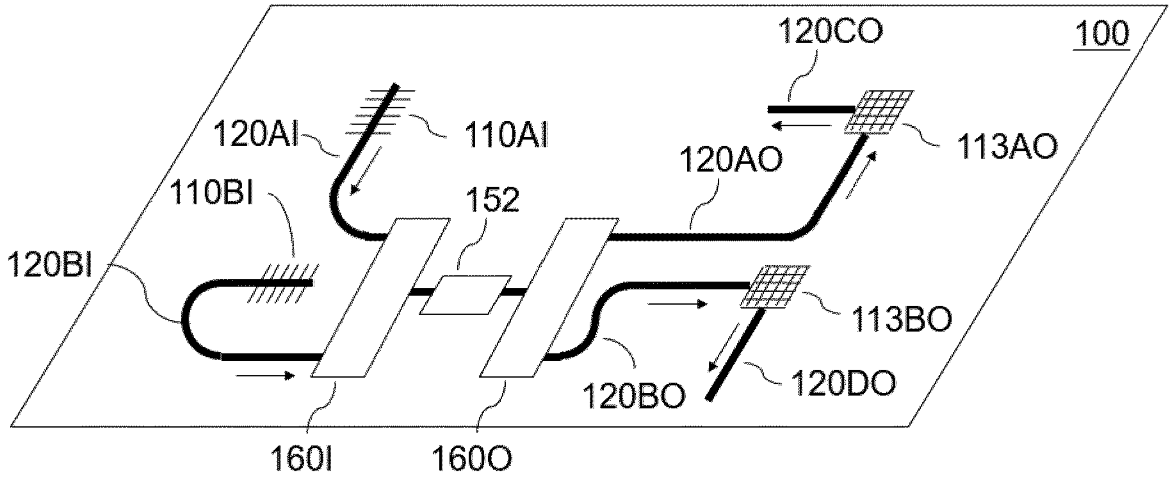
Figure 3C:
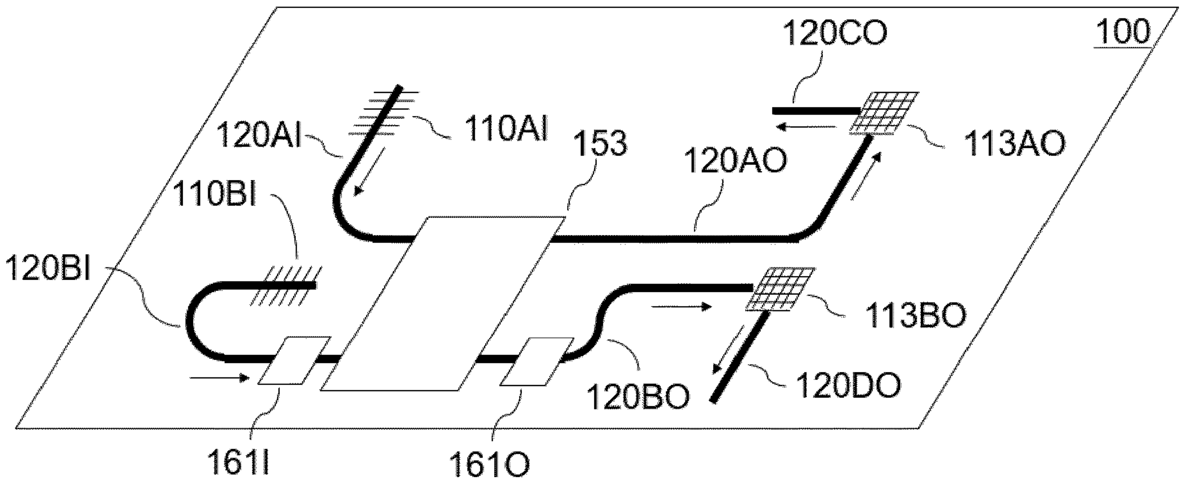
Figure 4A:
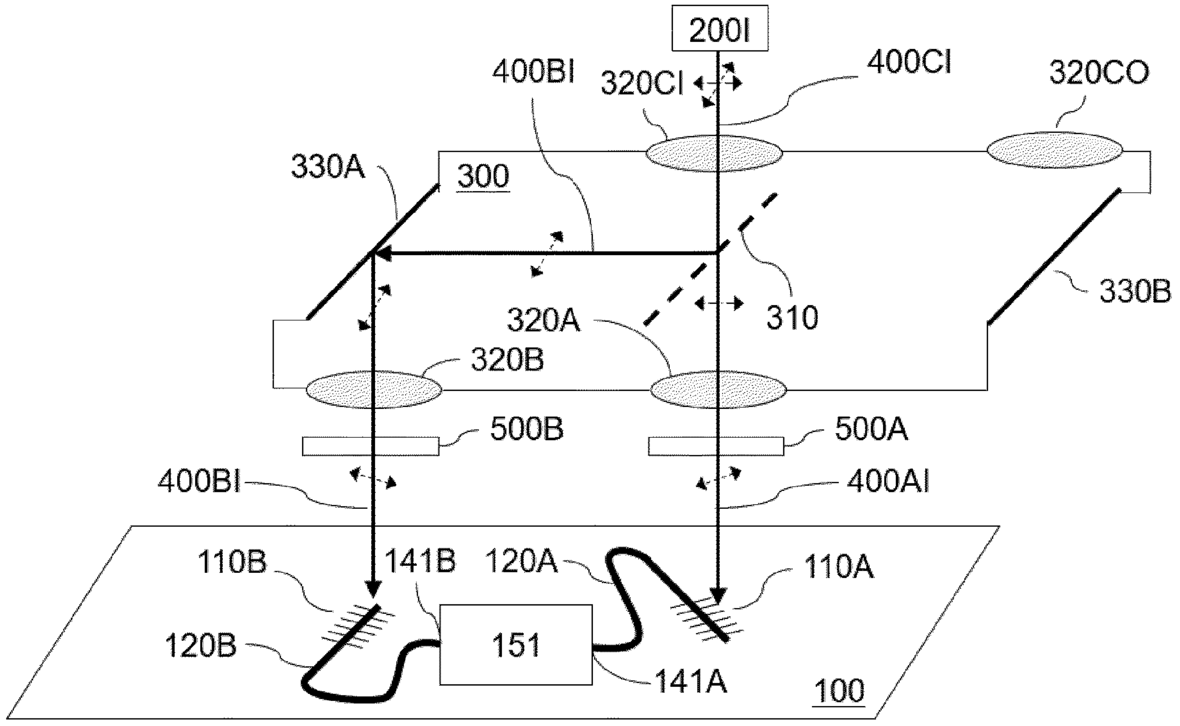
Figure 4B:
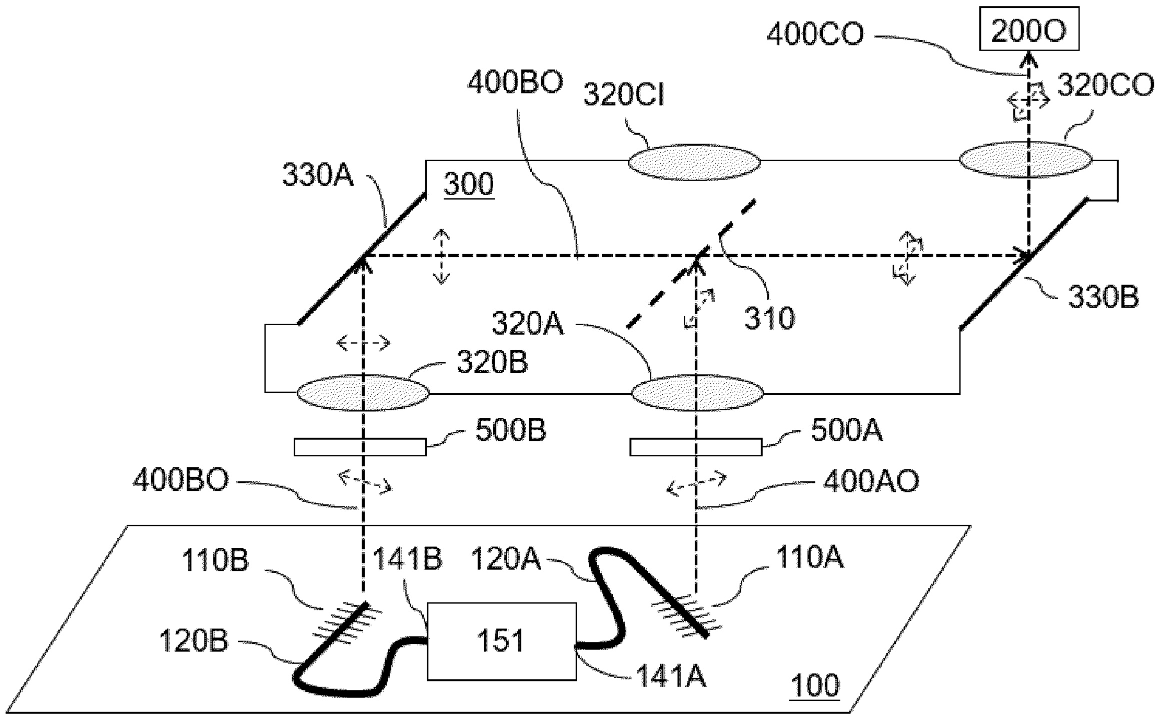
Figure 4C:
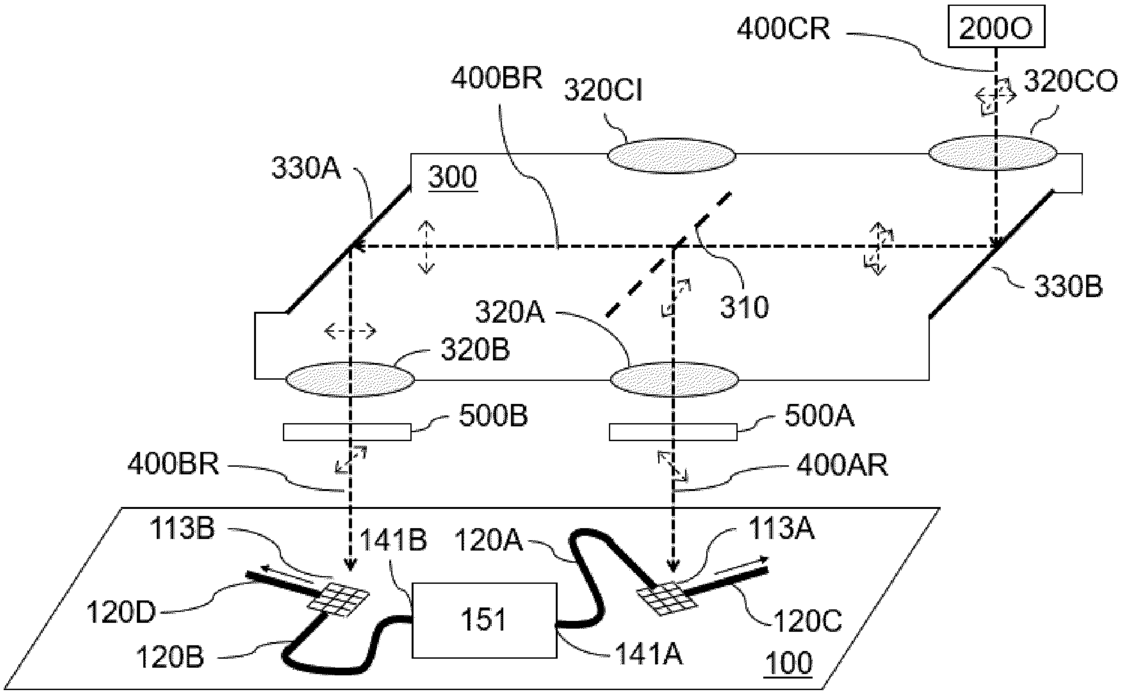
Figure 4D:
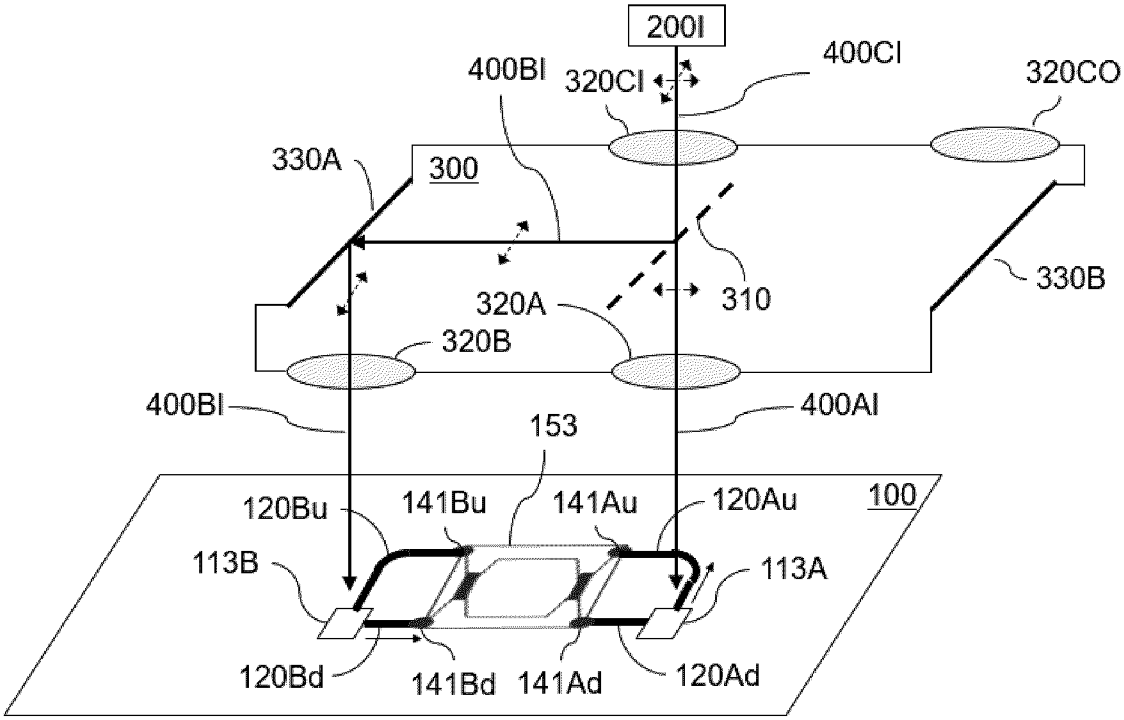
Figure 4E:
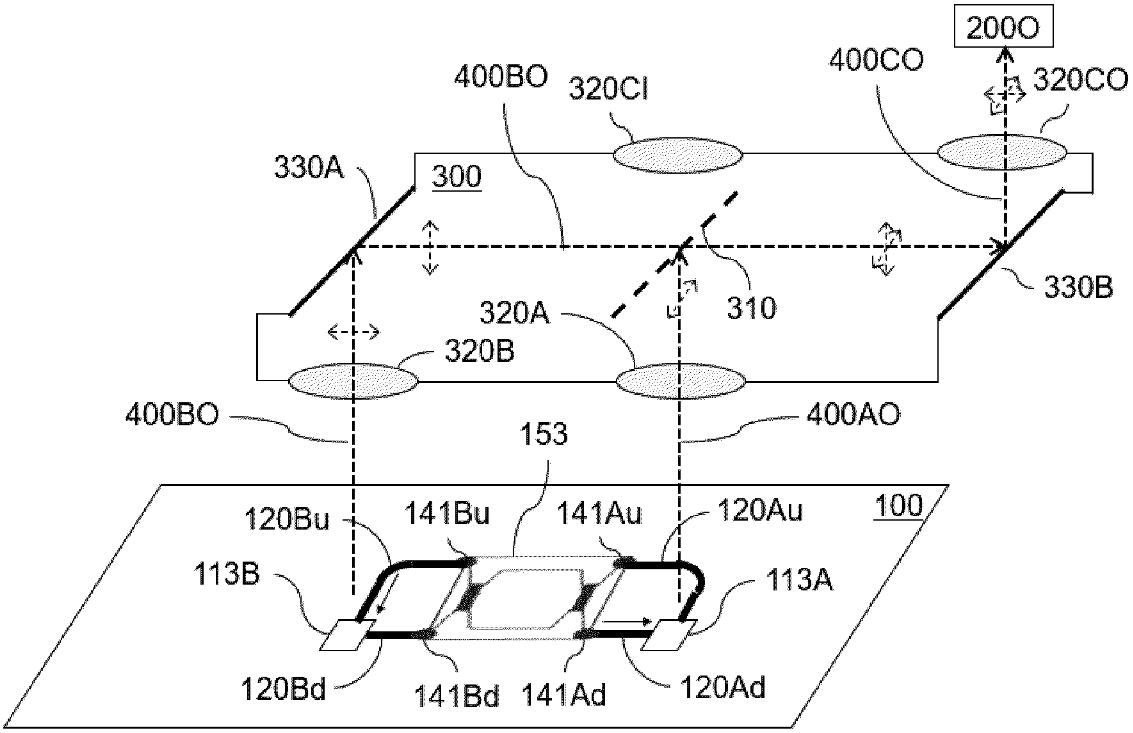
Figure 5:
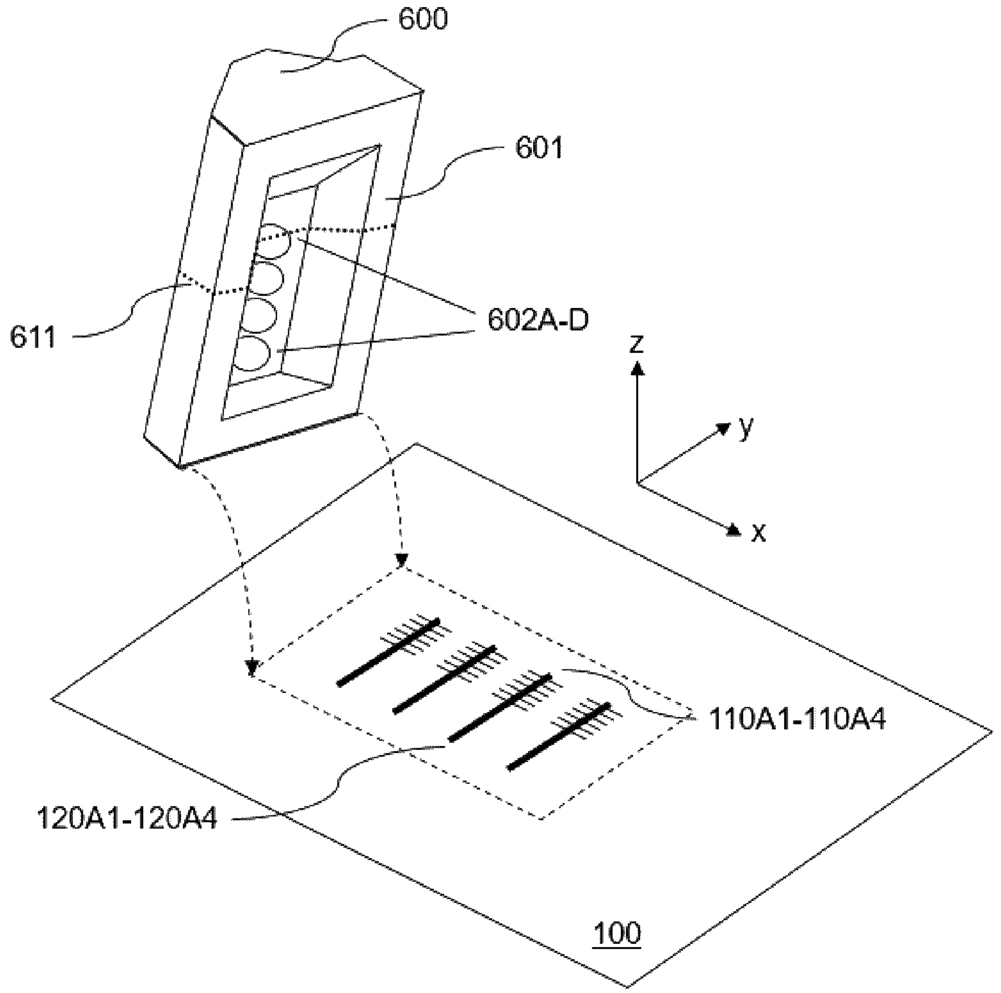
Figure 6A:
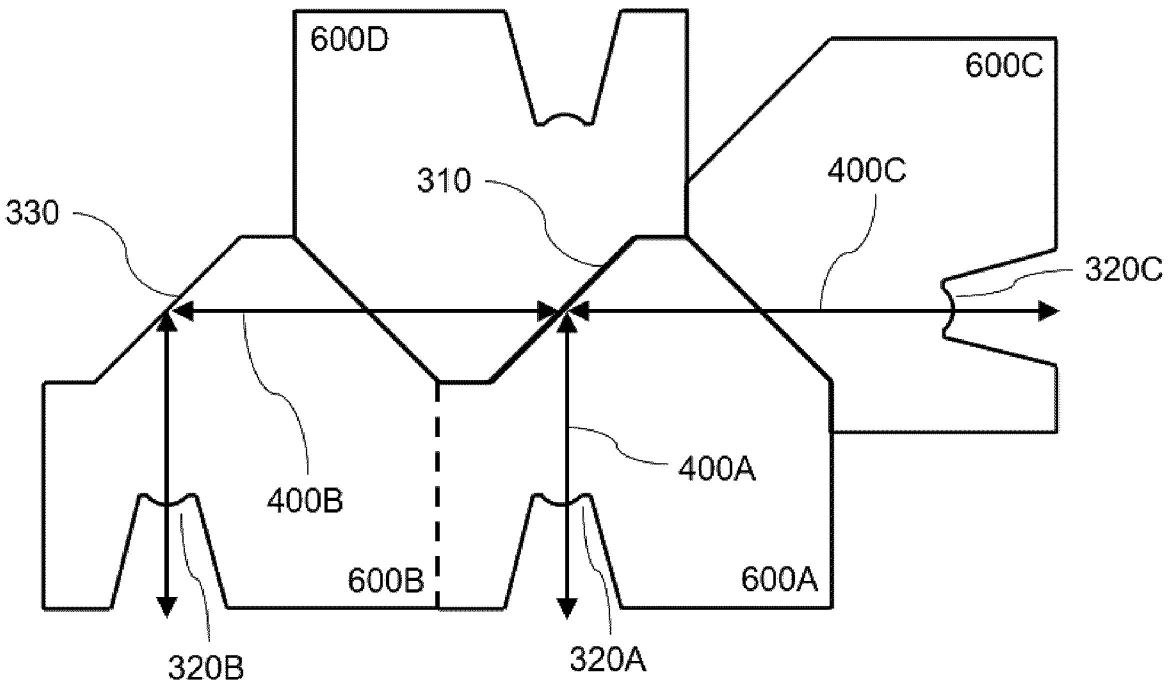
Figure 6B:
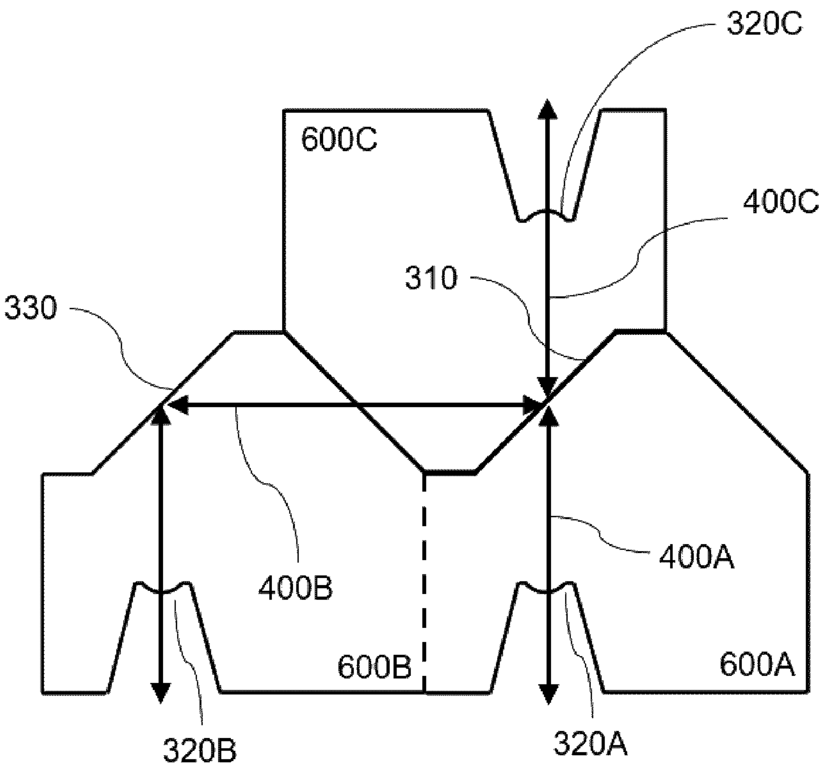
Figure 6C:
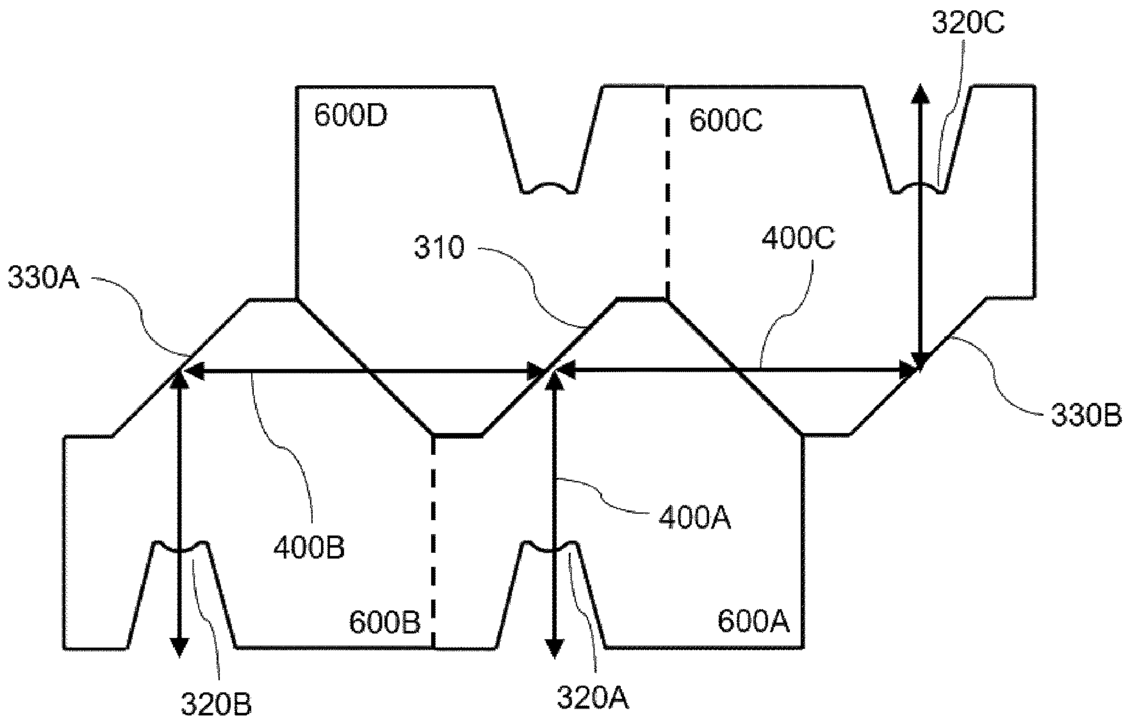
Figure 6D:
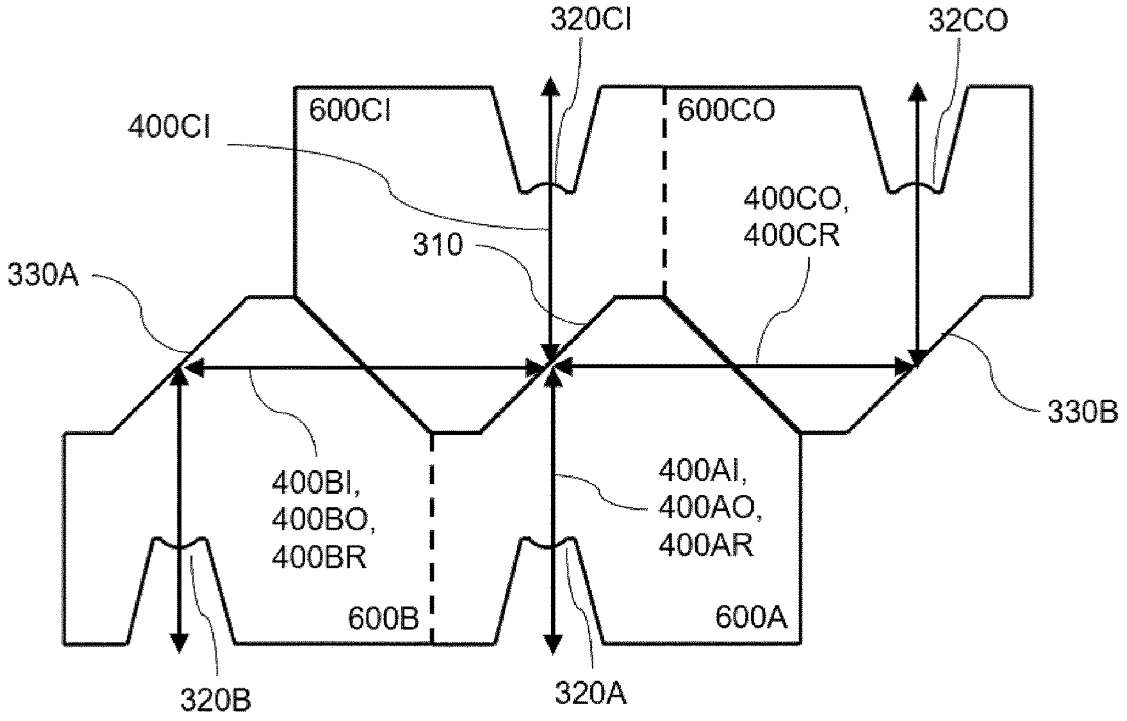
Figure 6E:
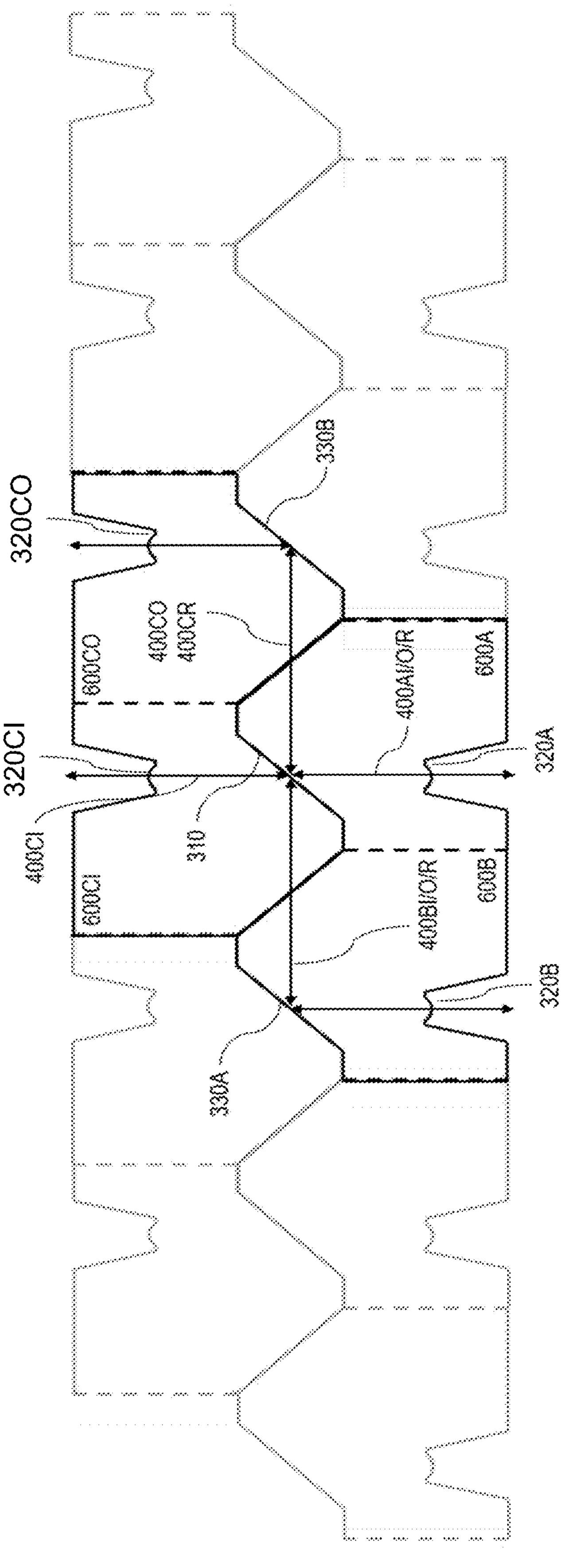
Figure 7A:
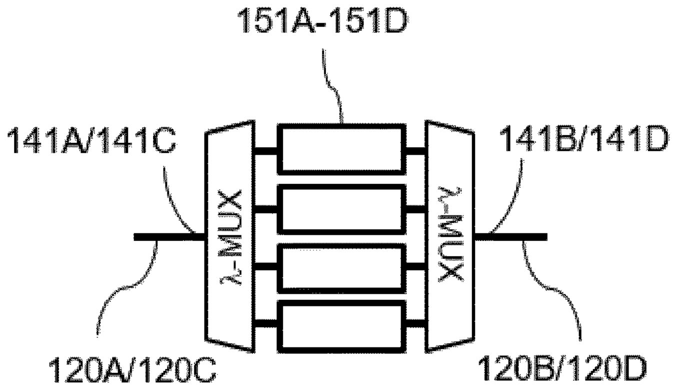
Figure 7B:
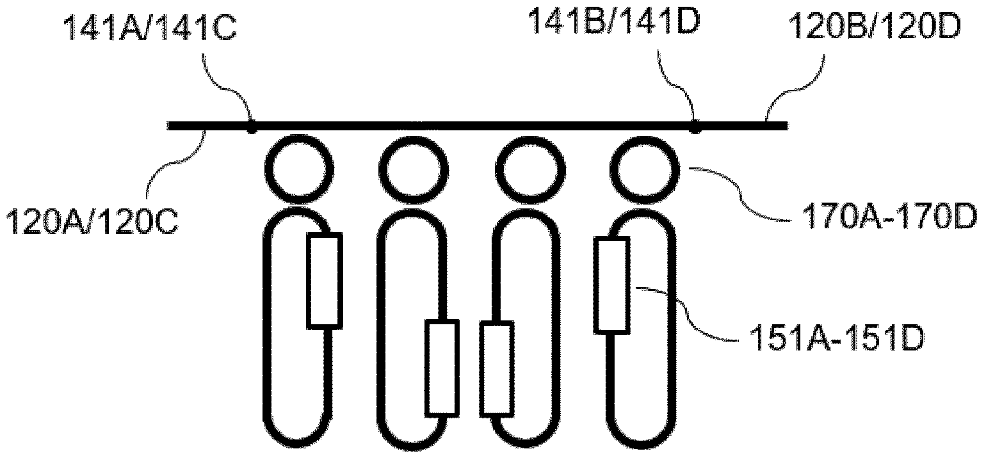
Figure 7C:
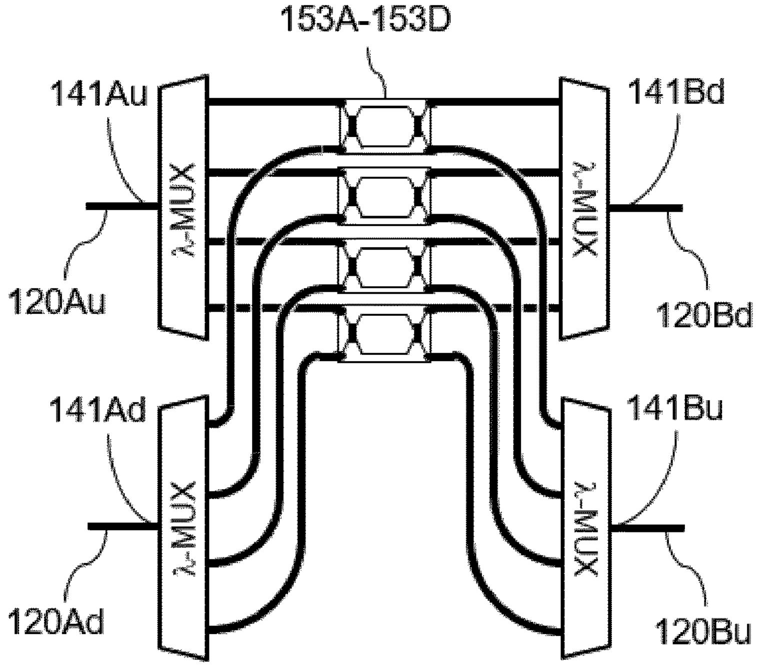
Figure 8A:
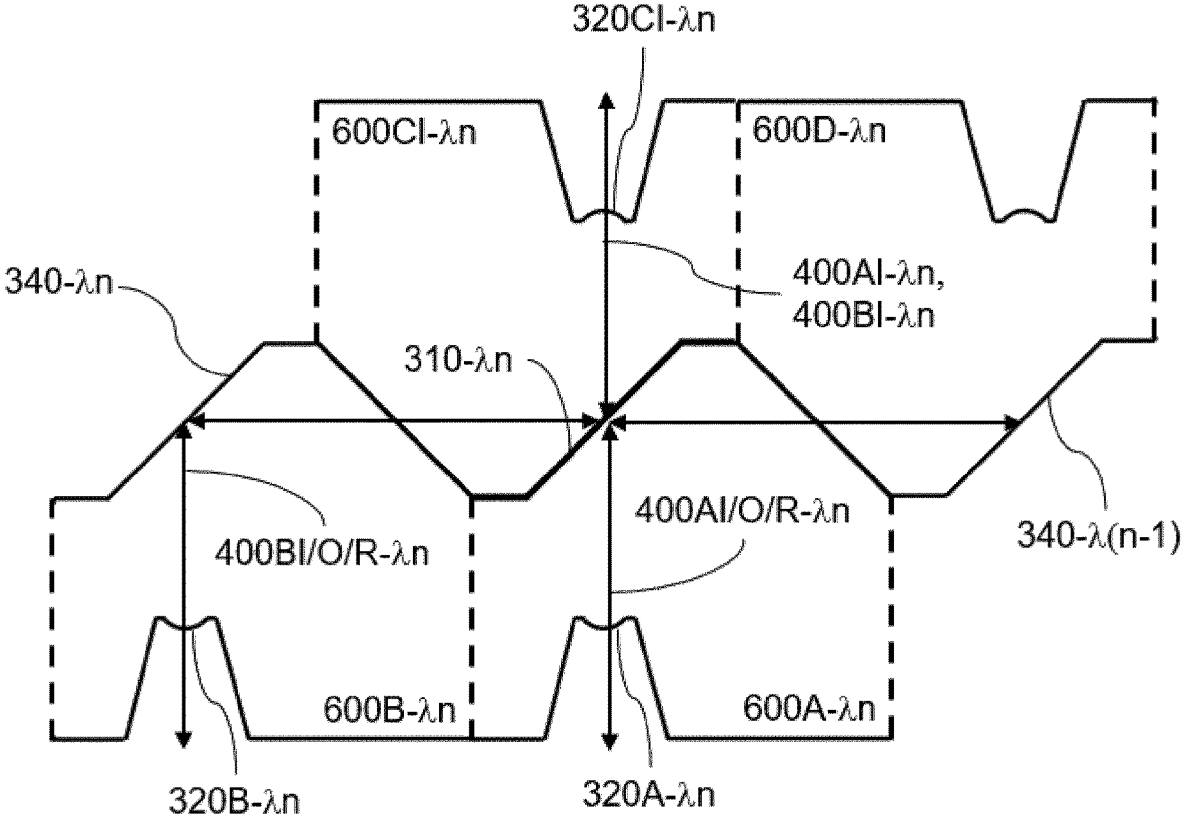
Figure 8B:
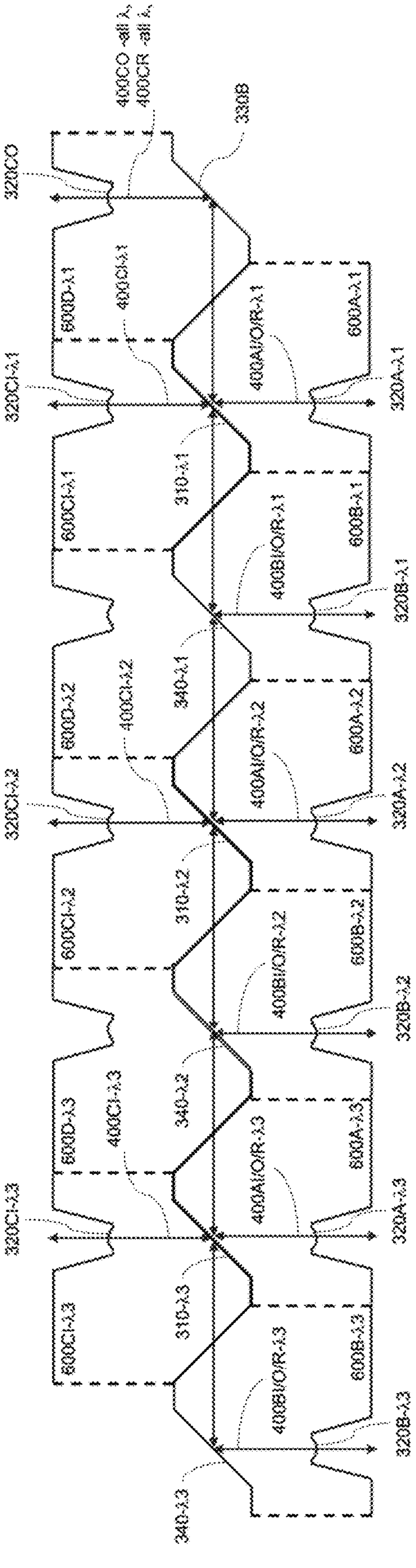
Figure 8C:
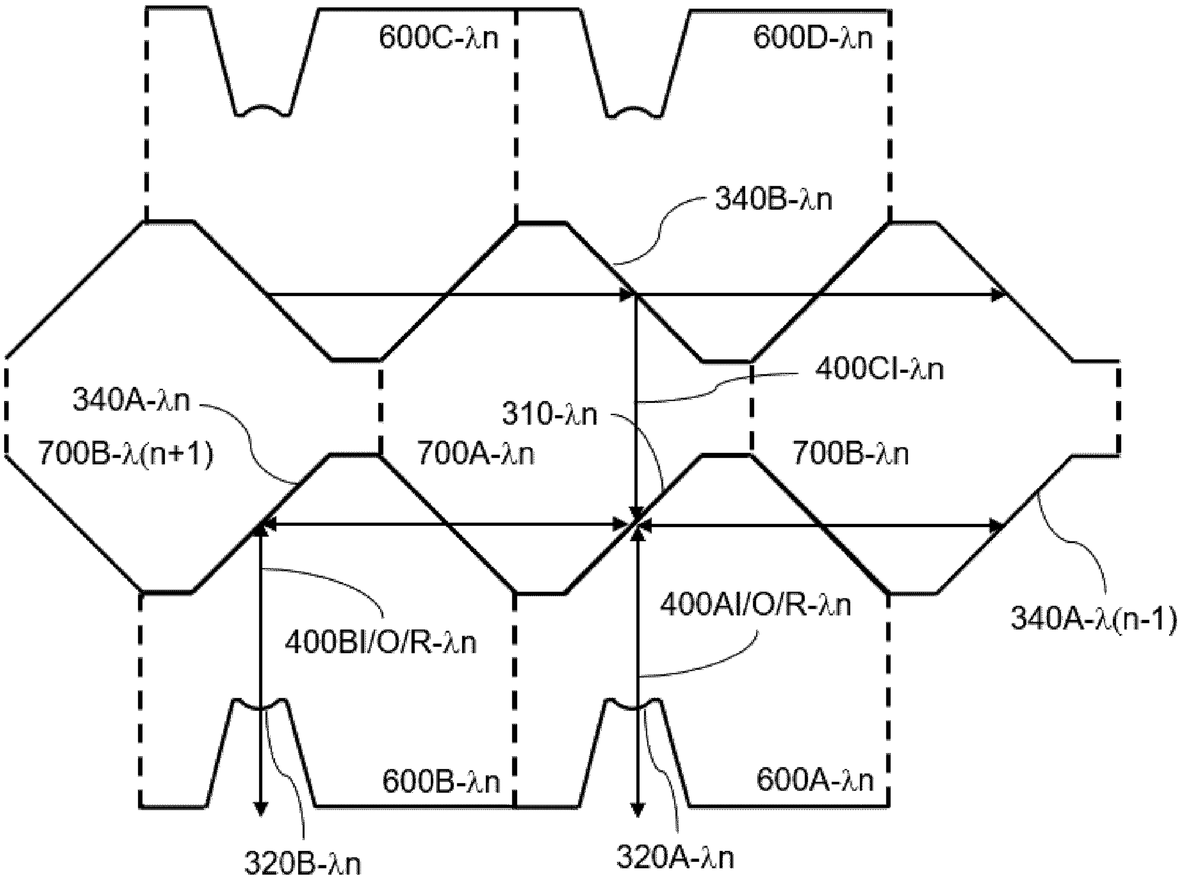
Figure 8D:
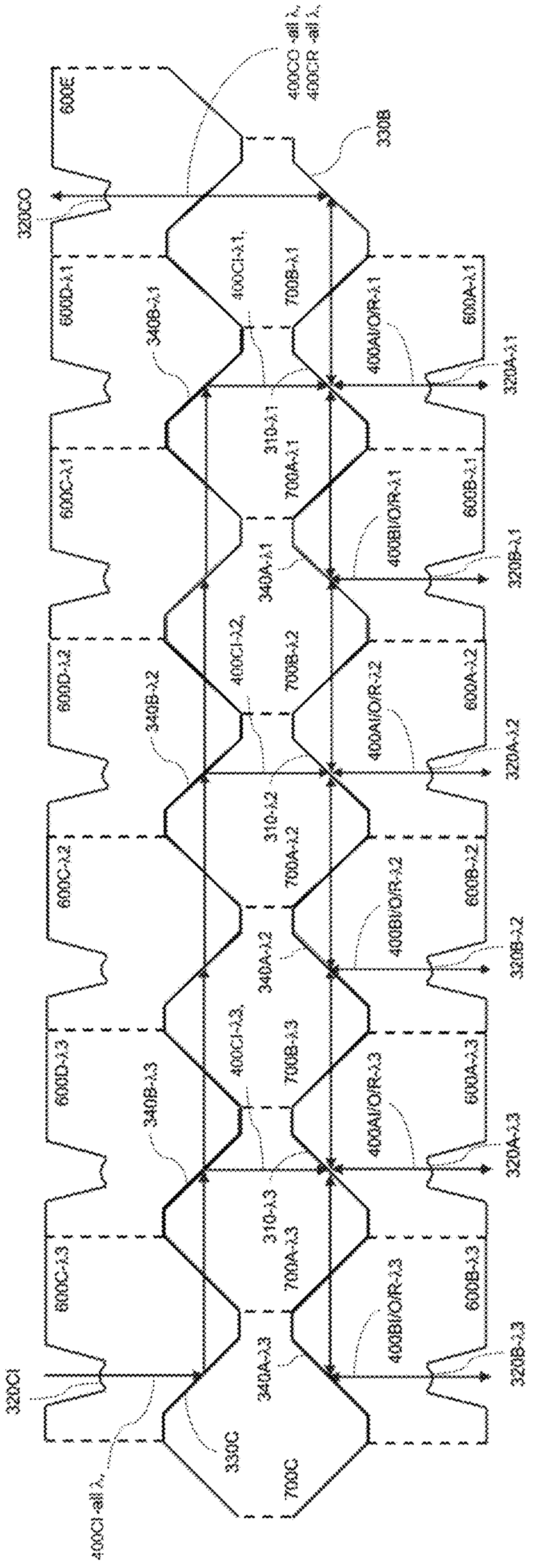
Figure 8E:
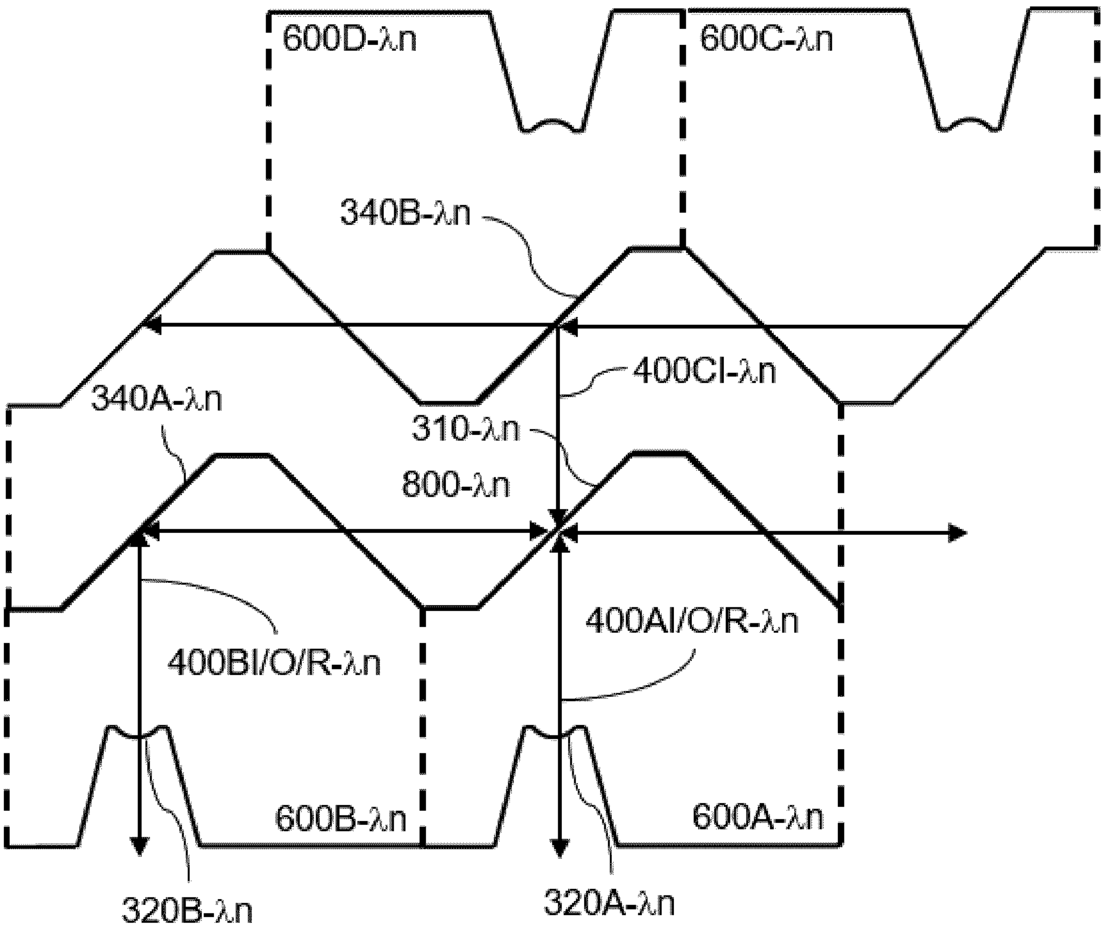
Figure 8F:
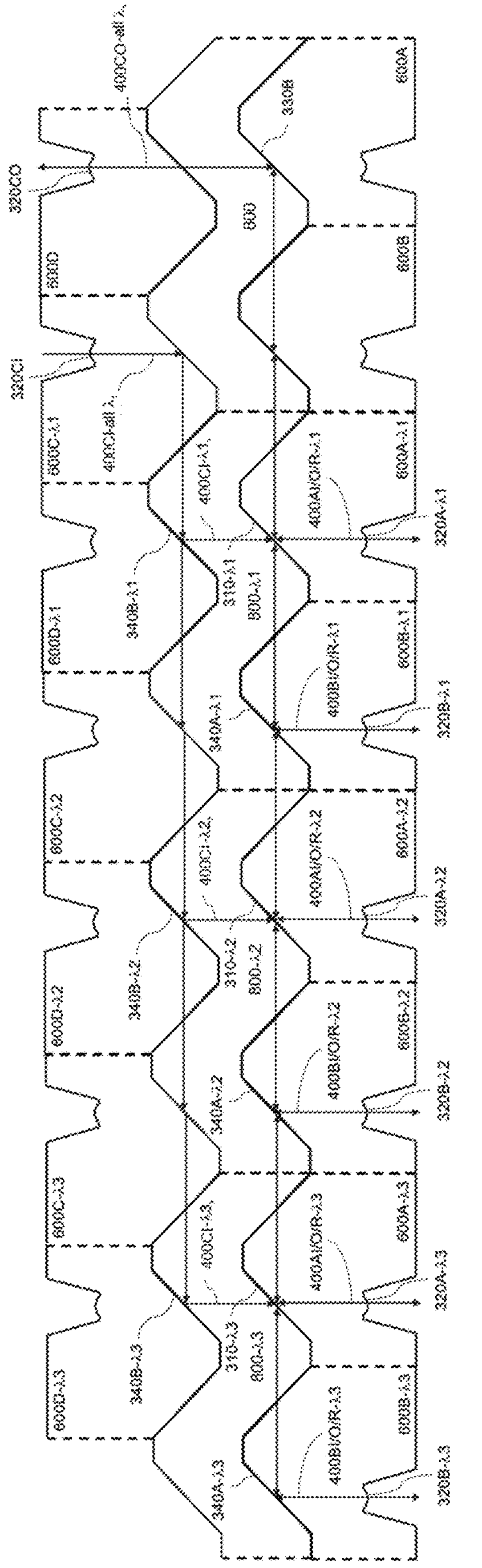

In the following, the invention shall be explained in more detail by means of the embodiment(s) with reference to the attached schematic figure(s). The figure(s) shows (show):

FIG. 1(*a*)-(*d*) illustrations of exemplary photonic arrangements with different photonic interposer configurations;

FIG. 2(*a*)-(*d*) illustrations of exemplary photonic integrated circuit configurations for co-packaged optics;

FIG. 3(*a*)-(*c*) illustrations of exemplary photonic integrated circuit configurations;

FIG. 4(*a*)-(*e*) illustrations of exemplary photonic arrangements;

FIG. 5 an illustration of a glass building block for photonic interposers;

FIG. 6(*a*)-(*e*) illustrations of exemplary photonic interposer implementations by building blocks;

FIG. 7(*a*)-(*c*) illustrations of exemplary modulator and photodetector arrangements; and FIG. 8(*a*)-(*f*) illustrations of different building blocks configurations for photonic interposer(s).

FIG. 1(*a*)-1(*d*) show four different exemplary photonic arrangements with different photonic interposer configurations together with a photonic integrated circuit 100 (may also be referred to herein as photonic chip) having surface emitting/surface receiving optical couplers 110A, 110B. The photonic integrated circuit 100 is coupled to an optical element, such as the optical fiber 200, by means of the photonic interposer 300. Light, also referred herein as light beam(s), can transit from the optical fiber 200 to the photonic integrated circuit 100 or vice versa via the photonic interposer 300. For example, light beams with either s- or p-polarization may be emitted from the optical fiber 200 and collimated by a lens 320C of the photonic interposer 300. The s- and p-polarizations are defined as polarizations that are respectively perpendicular and parallel relative to a plane of incidence of the light beams, further defined by the plane in which the light beams propagate before and after refraction, and are exemplarily represented by dashed double sided arrows in FIG. 1(*a*). The dashed double sided arrows are overlaid on the solid arrows which indicate a direction of propagation of the light beams.

In FIG. 1(*b*), light beam 400A is p-polarized and light beam 400B is s-polarized. A polarization selective beam splitter-/combiner 310 splits a light beam 400C into the light beams 400A, 400B according to its polarization. The terms polarization selective beam splitter-/combiner and polarization selective reflector may be used interchangeably. In FIG. 1(*b*), the polarization selective beam splitter-/combiner 310 is shown as a surface coating in MacNeille configuration, e.g., a MacNeille cube polarizer, which reflects light beams with the s-polarization and lets light beams with the p-polarization pass through. A reflector 330 also reflects the light beam that remains horizontal (due to reflection), after being reflected at the polarization selective beam splitter-/combiner 310, towards a surface of the photonic integrated circuit 100. A lens 320A, a lens 320B refocus the corresponding light beams 400A, 400B, split/divided by the polarization selective beam splitter-/combiner 310, onto surface couplers 110A, 110B of the photonic integrated circuit 100, respectively. The surface couplers 110A, 110B couple the respective light beams 400A, 400B into on-chip waveguides 120A, 120B. The surface couplers 110A, 110B may be single polarization couplers, that couple only beams with a single polarization, such as single polarization grating couplers. The surface couplers 110A, 110B may also be other types of couplers such as polarization splitting grating couplers, see for example U.S. Pat. No. 7,298,945 B2 entitled "Polarization Splitting Grating Couplers", which is incorporated by reference herein in its entirety. In case the surface couplers 110A, 110B are single polarization grating couplers, these may be rotated such that the direction of their grates is substantially parallel to the polarization of the incoming light beams 400A, 400B. This then results in couplers 110A, 110B that are oriented orthogonally relative to each other.

In addition, light may also propagate in the other direction, from the photonic integrated circuit 100 to the optical fiber 200, in which case the light beams 400A, 400B of orthogonal polarizations are emitted by the photonic integrated circuit 100, from the surface couplers 110A, 110B, collimated by the respective lenses 320A, 320B, routed to and combined by the polarization selective beam splitter-/combiner 310 to light beam 400C which is focused back by lens 320C into the optical fiber 200. In this disclosure, emitting/receiving couplers 110A, 110B may also be edge couplers of the photonic integrated circuit 100. In other words, couplers are not restricted to being surface couplers here or elsewhere in this disclosure.

The functionality described above, i.e., coupling light having two polarizations from an optical fiber 200 to two on-chip waveguides 120A, 120B according to the polarization of the light, may also be directly obtained with polarization splitting surface couplers such as polarization splitting grating couplers (PSGCs). PSGCs however typically suffer from the fact that the polarizations coupled to the optical fiber from either waveguide are not orthogonal to each other. This can be quantified by the cross-talk between the waveguides when excited by the main polarizations rotated ±45 degrees from the symmetry axis of the PSGC, which may typically be in the order of 16 dBm, see for example T. Watanabe, Y. Fedoryshyn, J. Leuthold, "2-D Grating Couplers for Vertical Fiber Coupling in Two Polarizations," IEEE Photonics Journal, vol. 11, no. 4, Art. ID 7904709, August 2019, which is incorporated by reference herein in its entirety. This leads to polarization dependent insertion losses, in the order of 3 dB for this level of cross-talk. Cascading several such optical interfaces in an optical link would lead to substantial polarization dependent insertion losses. Here, on the other hand, splitting or combining of the polarizations is done by a polarization selective beam splitter-/combiner 310, as for example also used in polarization beam splitter-/combiner cubes. Such beam splitter-/combiners easily reach extinction ratios between the transmitted and reflected polarization of better than 30 dB, so that such problems may be avoided.

The configuration shown in FIG. 1(*a*) as a first photonic interposer configuration may for example be advantageous for transceivers implemented in pluggable module form factors, for which optical fibers 200 are typically routed to the side of the package. FIG. 1(*b*) shows a second photonic interposer configuration in which the lens 320C is positioned on top rather than on the side of the photonic interposer 300. The configuration shown in FIG. 1(*b*) may be advantageous for co-packaged optics, for which high densities of optical fibers 200 may be used, that are more straightforward to achieve by routing the optical fibers 200 from the top of the package.

FIG. 1(*c*) shows a third photonic interposer configuration, in which non-reciprocal Faraday rotators 500A, 500B are added in the respective paths of light beams 400A, 400B, in between the photonic interposer 300 and the photonic integrated circuit 100. This way, optical isolation functionality can be added to the coupling apparatus comprising photonic integrated circuit 100 and photonic interposer 300. The Faraday rotators 500A, 500B rotate the polarization of the light beams 400A, 400B by 45 degrees, respectively. The surface couplers 110A, 110B receive the resulting light beams with rotated polarizations, for example by further rotating them by an additional 45 degrees, as shown in FIG. 1(*c*). Light that is reflected back with the same polarization as the one that is nominally received by the surface couplers 110A, 110B ends up being rotated by 90 degrees relative to the incoming light, after passing the Faraday rotators 500A, 500B a second time, as a consequence of the non-reciprocal nature of the Faraday rotators 500A, 500B. In consequence, reflected light or light emitted from waveguides 120A, 120B via couplers 110A, 110B does not pass to the optical fiber 200. In this example, it is passed from the polarization selective beam splitter-/combiner 310 to the top of the photonic interposer 300. By implementing the couplers 110A, 110B as single polarization couplers, or by ensuring that the photonic integrated circuit 100 only reflects light with the polarization that is received, isolation from back-reflections can thus be achieved. If the direction in which the Faraday rotators 500A, 500B rotate the light is switched, or if the couplers 110A, 110B are rotated by 90 degrees, the isolation functionality is obtained in the other direction. The photonic interposer 300 can then pass light from the photonic integrated circuit 100 into the optical fiber 200, but light coming back from the optical fiber 200 is prevented from entering the photonic integrated circuit 100. The configuration with Faraday rotators 500A, 500B as described here is equally applicable to a geometry in which the lens 320C is placed on top of the photonic interposer 300, as shown in FIG. 1(*b*).

Starting from the third exemplary photonic interposer configuration of FIG. 1(*c*) that allows emitting light from couplers 110A, 110B and passing it into the optical fiber 200 with opposite polarizations, the couplers 110A, 110B are further configured to be able to receive light beams having opposite polarization than the one included in the light beams they are emitting, and respectively couple the light beams to waveguides 120C and 120D. This can be achieved by implementing the couplers 110A. 110B of FIG. 1(*a*)-(*d*) as polarization splitting grating couplers, such as polarization splitting grating couplers 113A, 113B as shown in FIG. 1(*d*) as a fourth exemplary photonic interposer configuration. The waveguides 120C, 120D can then be further connected to photodetectors (not shown). This can serve as a bidirectional link, such that both a transmitter and a receiver can be implemented in the photonic integrated circuit 100. Modulated light beams from waveguides 120A. 120B are passed to the optical fiber 200 with opposite polarizations. Light from the optical fiber 200 is passed to waveguides 120C, 120D according to its polarization. The waveguides 120C. 120D can be connected to a single or two separate photodetectors. If the two polarizations of the incoming light from the optical fiber 200 carries the same optical signal, the two waveguides 120C, 120D can for example be connected to the two ends of a single waveguide photodiode in order to recombine the signals. The modulated light beams applied to waveguides 120A, 120B can be different, when polarization multiplexing is being used, but they can also be the same, for example in a co-packaged optics solution in which light is provided by an external laser coupled with a regular, non-polarization maintaining fiber. In that case, a same signal can be applied to both polarizations in order to guarantee that sufficient signal strength is obtained irrespective of how the power is being split between the polarizations, for example due to polarization scrambling in the single mode fiber connecting the laser to the co-packaged transceiver. Similar considerations hold for the photonic interposer configurations of FIG. 1(*a*)-1(*c*) when they are used to transmit light into an optical fiber. Arrows in FIG. 1(*d*) show the intended direction of light inside the on-chip waveguides 120A-120D. This scheme can be applied irrespectively of whether the lens 320C is on the side, or on top of the photonic interposer 300 as in FIG. 1(*b*), in which case the rotation angle of the Faraday rotators 500A, 500B may be switched or the direction of the light flow in the on-chip waveguides 120A-120D may be switched (i.e. waveguide 120A switched with waveguide 120C and waveguide 120B switched with waveguide 120D) to obtain the same result.

While the configuration shown in FIG. 1(*d*) may rely on polarization splitting grating couplers 113A, 113B, incoming light arriving at the PSGCs 113A, 113B always has the same polarization, and outgoing light emitted by PSGCs 113A, 113B always has the same polarization. Moreover, the polarization of the incoming and of the outgoing light are both typically rotated 45 degrees relative to the symmetry plane of the PSGCs and undergo equal coupling losses. Consequently, polarization dependent losses are much less of an issue here. In particular, cross-talk between the two polarizations may be avoided and losses may be constant. The worst case may thus be avoided.

Polarization management can be a major issue for co-packaged optics in case the laser is kept external from the remaining co-packaged transceiver package and connected via a fiber. A configuration of photonic interposer 300 and photonic integrated circuit 100 can be understood as package in general, as co-packaged transceiver, or as co-packaged transceiver package. Indeed, keeping a laser external from co-packaged optics has many advantages, such as reducing the heat load of the co-packaged optics/electronics, reducing the temperature at which lasers have to be operated (and consequently increasing their wall-plug efficiency), as well as allowing replacement of the lasers if they burn out. However, connecting such lasers to the co-packaged optics' transceivers with a polarization maintaining (PM) fiber is not cost effective, as the PM fiber is expensive by itself and is also expensive to assemble, as its slow or fast axes need to be carefully aligned with the intended polarization of the transmitted light. Consequently, it is very desirable to have a packaging scheme that is compatible with polarization scrambling between the laser and the co-packaged transceiver. However, the co-packaged transceiver then has to handle this polarization diversity.

FIG. 2(*a*)-(*d*) illustrate exemplary photonic integrated circuit configurations for co-packaged optics with which polarization diversity can be dealt with in a co-packaged transceiver receiving light from an external laser via a non-polarization maintaining single mode fiber. In particular, FIG. 2(*a*)-(*d*) exemplify photonic integrated circuit configurations.

In FIG. 2(*a*), light from an input optical fiber 200I is coupled by a coupling apparatus CI to two waveguides 120AI, 120BI. The coupling apparatus CI may for example be a polarization splitting grating coupler, an edge coupler followed by a polarization splitter rotator, or one of the couplers 110A, 110B shown in FIG. 1(*a*)-1(*c*). Light passed through the two waveguides 120AI, 120BI is modulated by modulators 150A, 150B according to a same data stream, prior to being recombined and coupled to output optical fiber 200O by coupling apparatus CO. The coupling apparatus CO may for example be a polarization splitting grating coupler, an edge coupler preceded by a polarization rotator combiner (which is the same device as a polarization splitter rotator, just with light flowing in the opposite direction), or one of the couplers 110A. 110B as shown in FIG. 1(*a*)-1(*c*). As a disadvantage, this configuration uses two electro-optical modulators, doubling the associated power consumption. A polarization splitter rotator splits light according to its polarization from an input to one of two output waveguides and rotates the polarization in one output waveguide such that the resulting polarizations are the same in both output waveguides.

In FIG. 2(*b*), after being coupled to waveguides 120AI, 120BI, light is combined by polarization rotator combiner 160I such that it ends up in the output waveguide of 160I with opposite polarizations depending on which of the waveguides it was coupled from. It is further modulated by dual-polarization modulator 152, split by polarization splitter rotator 160O, and combined and coupled to output optical fiber 200O by output coupling apparatus CO. As a disadvantage, this configuration uses a modulator that efficiently modulates both polarizations, which is challenging to achieve without performance impairments.

In FIG. 2(*c*), after being coupled to waveguides 120AI, 120BI, light is rotated to the other polarization by polarization rotator 161I in one of the waveguides 120AI, 120BI, before being modulated by a Mach-Zehnder modulator (MZM) 153 configured to have two complementary input and two complementary output ports, by using 2 by 2 splitter-/combiner at both its input and its output. As a disadvantage, the MZM 153 is further used to modulate both polarizations. At the output of the MZM 153, light is rotated back in one of the waveguides 120AO, 120BO by polarization rotator 161O, before being combined and coupled to output optical fiber 200O by coupling apparatus CO. Since the coupling apparatus CO only couples light with the correct polarization to output optical fiber 200O, the polarization rotator 161O, together with the polarization rotator 161I, ensures that same data streams are coupled from both waveguides 120AO and 120BO to output optical fiber 200O, as opposed to also having the complementary data streams coupled to fiber 200O.

In FIG. 2(*d*), after being coupled to waveguides 120AI, 120BI, light is coupled into a 2 by 2 MZM 153 at opposite/alternate/different ends, so that light propagates in different directions inside the MZM. After modulation, light is further picked up by waveguides 120AO and 120BO at the ports complementary to the ones used as input ports, again at opposite ends of the device, and combined and coupled to output optical fiber 200O by output coupling apparatus CO. In this configuration, the MZM 153 may be able to modulate light with one or both polarizations. Further, the MZM 153 may be a lumped element modulator that modulates light efficiently irrespectively of the direction in which it travels.

Consequently, each of these configurations of FIG. 2(*a*)-(*d*) may have their limitations. When coupling apparatuses CI, CO are implemented by polarization splitting grating couplers, polarization dependent losses and cross-talk between the two polarization channels, resulting in interferences as the light is being recombined in the output optical fiber 200O, can create significant link budget impairments. Thus, it may be advantageous to embody coupling apparatuses CI, CO with configurations using an photonic interposer as represented in FIG. 1(*a*)-1(*d*). As a further advantage when the coupling apparatus CO is implemented with the configuration as shown in FIG. 1(*d*), light can also be received from output optical fiber 200O and routed to one or several photodetectors.

FIG. 3(*a*)-3(*c*) show exemplary photonic integrated circuit configurations respectively corresponding to FIG. 2(*a*)-2(*c*). The photonic integrated circuit configuration as shown in FIG. 2(*d*) can be similarly implemented by permutating the ports of the MZM 153 and omitting the elements 161I and 161O in FIG. 3(*c*). In each of FIG. 3(*a*)-3(*c*), the input couplers 110AI, 110BI are configured as single polarization grating couplers such that they can be coupled to an (input) photonic interposer 300 as shown in FIG. 1(*a*)-1(*c*). The output couplers 113AO, 113BO are configured as polarization splitting grating couplers and connected to further waveguides 110CO and 110DO, such that they can be coupled to another (output) photonic interposer 300 as shown in FIG. 1(*d*). The input and output photonic interposers can be arranged at the photonic integrated circuit 100 as one piece.

In all of such co-packaged optics photonic integrated circuit configurations, the photonic interposers 300 as shown in FIG. 1(*a*)-1(*d*) can be used to receive light from a laser connected by means of a non-polarization maintaining optical fiber 200I scrambling the polarization, and to split/divide the light into one of two waveguides 120AI, 120BI for further modulation according to a single data stream applied to both initial polarizations. In all of these co-packaged optics photonic integrated circuit configurations, photonic interposers 300 as shown in FIG. 1(*a*)-1(*d*) can further be used to couple light from two waveguides 120AO, 120BO each carrying light to which the same data stream has been applied, to a single output optical fiber 200O, with opposite polarizations. Moreover, the polarization with which light is coupled to the output optical fiber 200O is determined by the polarization with which light was received from the input optical fiber 200I. Moreover, light coupled to waveguide 120AI is coupled to one of waveguides 120AO or 120BO after modulation, and light coupled to waveguide 120BI is coupled to the other one of waveguides 120AO or 120BO after modulation. Consequently, light beams 400AI, 400BI can enter the photonic integrated circuit 100 and pass the electro-optical modulators 150A, 150B after which they are coupled out of the photonic integrated circuit 100 as light beams 400AO and 400BO (cf. FIG. 3(*a*), FIG. 4(*a*) and FIG. 1(*a*)-(*d*)). As such, light beam 400AI results in the light beam 4000A, light beam 400BI results in the light beam 400BO.

It may be advantageous to reduce the number of used optical ports on the photonic integrated circuit 100 and the number of used lenses on the (input and output) photonic interposers. First and second configurations allowing these are shown in FIG. 4(*a*)-(*e*) showing exemplary photonic arrangements with the photonic integrated circuit 100 and the photonic interposer 300 as described above with respect to FIG. 1(*a*)-3(*c*).

FIG. 4(*a*)-(*e*) have in common that a single optical coupler 110A, a single optical coupler 110B, a single waveguide 120A, a single waveguide 120B, a single lens 320A, a single lens 320B and/or a single polarization beam splitter-/combiner 310 are used instead of two couplers 110AI, 110AO, two couplers 110BI, 110BO, waveguides 120AI, 120AO, waveguides 120BI, 120BO, two lenses 320A, two lenses 320B and/or two polarization selective beam splitter-/combiners 310 as shown with respect to the foregoing figures, for example. FIG. 4(*a*)-(*e*) further have in common a bidirectional (electro-optical) modulator 151 defined as a modulator that modulates the light irrespectively of the direction in which it transits through the device.

The first configuration is shown in FIG. 4(*a*)-4(*c*). FIG. 4(*a*) shows optical paths which is passed by the polarization diverse light supplied by the input optical fiber 200I. From the perspective of the corresponding light beams 400AI, 400BI, the photonic interposer 300 is configured similarly to FIG. 1(*b*) with the additional refinement that Faraday rotators 500A, 500B are used as in FIG. 1(*c*). The structure of the photonic integrated circuit 100 comprises a bidirectional modulator 151 with two optical ports 141A, 141B. Waveguide 120A is connected to optical port 141A, waveguide 120B is connected to optical port 141B. The bidirectional modulator 151 is further configured such that at least part of the light entering through port 141A exits through port 141B, and such that at least part of the light entering through port 141B exits through port 141A. It is thus a bidirectional photonic circuit. The bidirectional modulator 151 may be configured with two ports such that light transiting in either direction from one of these ports to the other gets modulated according to the same data stream. While this is problematic to realize in travelling wave modulators, since light has to propagate in the same direction as the radio-frequency (RF) wave in order to be efficiently modulated, other classes of modulators do not have this restriction. Lumped element modulators are very compact modulators that can be considered a point load from an RF perspective. In silicon photonics, these comprise compact direct absorption modulators, for example SiGe or heterogeneously integrated III-V modulators using the Franz-Keldysh or the quantum confined Stark effect, resonantly enhanced modulators such as ring modulators or resonantly assisted MZM modulators, slow wave modulators, or compact MZM modulators with highly efficient silicon-insulator-semiconductor capacitive phase shifters operated in the carrier accumulation regime. Another class of such SISCAP devices combining silicon with heterogeneously integrated III-V materials on the other side of the insulator may be used for high-efficiency, low loss modulation. Such lumped element modulators can be straightforwardly configured to be bidirectional modulators, since the constraints of travelling RF waves do not apply. An example of resonantly assisted MZM as a lumped element operates in both directions and over a wide temperature range. Such an example can be found in S. Romero-García et al., "High-speed resonantly enhanced silicon photonics modulator with a large operating temperature range," Opt. Lett., vol. 42, no. 1, pp. 81-84, ja. 2017. An example of silicon-III-V hybrid SISCAP devices can be found in J.-H. Han et al., "Efficient low-loss InGaAsP/Si hybrid MOS optical modulator," Nat. Photon., vol. 11, pp. 486-490, July 2017 which is incorporated by reference herein in its entirety.

After entering bidirectional modulator 151 through one of the ports 141A, 141B and passing through the bidirectional modulator 151, for example by being modulated by the bidirectional modulator 151, at least part of the light exits the bidirectional modulator 151 again through the other one of ports 141A, 141B and is coupled back to waveguides 120A, 120B. The return light beam paths are shown in FIG. 4(*b*). The respectively modulated light beams are passed through waveguides 120A, 120B to couplers 110A, 110B and emitted as light beams 400AO and 400BO which propagate further to lens 320CO that focuses the light into output optical fiber 200O. The photonic arrangement as shown in FIGS. 4(*a*) and (*b*) may be non-reciprocal. Thus, light is coupled to a different output optical fiber 200O from the one it came (input optical fiber 200I) even though it is reemitted by couplers 110A, 110B with the same polarization with which it was received, which is made possible by use of the Faraday rotators 500A, 500B. The light beams 400AO and 400BO take the reverse path of the light beams 400AI, 400BI up to the polarization selective beam splitter-/combiner 310. At that point, however, instead of being routed back to lens 320CI, light beams 400AO and 400BO are routed to a different path leading to another lens 320CO as a consequence of their polarization being switched compared to light beams 400AI, 400BI. Further, the optical path from polarization selective beam splitter-/combiner 310 to lens 320CO may comprise a further reflector 330B used to (essentially total) reflect horizontal light beam 400C towards the lens 320CO.

This way, a photonic interposer/arrangement can be achieved that allows modulation of light having both polarizations provided by input optical fiber 200I with a same data stream and coupling back light having both polarizations to output optical fiber 200O, while only a single (electro-optical) bidirectional modulator 151 is in use. Thus an effective photonic transceiver arrangement can be achieved.

In case the output optical fiber 200O of the transceiver also serves to receive modulated light in a bidirectional link, the photonic arrangement shown in FIGS. 4(*a*) and 4(*b*) may be combined with the photonic arrangement as shown in FIG. 1(*d*). This scenario is shown in FIG. 4(*c*), in which couplers 113A, 113B are implemented as polarization splitting grating couplers. The path of the light beams 400AI, 400BI, the path through the photonic integrated circuit 100 and the path of the light beams 400AO, 400BO remain as shown in FIGS. 4(*a*) and 4(*b*).

FIG. 4(*c*) illustrates the path of the additional light beams 400AR, 400BR received from the optical fiber 200O that may be modulated and routed to photodetectors from the photonic integrated circuit 100. The photodetectors may also be part or mounted on the photonic integrated circuit 100. Due to the non-reciprocal nature of the Faraday rotators 500A, 500B, the polarizations with which light beams 400AR, 400BR reach the couplers 113A, 113B is the opposite of the polarizations with which light beams 400AI, 400BI are being received and light beams 400AO, 400BO are emitted, such that light beams 400AR, 400BR are being coupled to waveguides 120C and 120D and not to waveguides 120A, 120B, allowing to separate light 400CR incoming from output optical fiber 200O, that is intended for a receiver, from a transmitter modulating light beams 400AO and 400BO. Waveguides 120C and 120D can then be further connected to a single or to separate photodetectors, wherein a single photodetector may be advantageous to recombine the signal streams when both polarizations of the incoming light 400AR, 400BR from the optical fiber 200O are modulated according to the same data stream.

FIG. 4(*a*)-4(*c*) describe lens 320CI as receiving light from input optical fiber 200I, lens 320CO as transmitting light to (output) optical fiber 200O and receiving light from optical fiber 200O. Nevertheless, the role of fibers 200I, 200O can be swapped and the directions of all the light beam paths inverted, by switching the direction of rotation of the Faraday rotators (for example by flipping them or poling them in the opposite direction), or by rotating the couplers 110A, 110B and their associated waveguide ports by 90 degrees. As an important differentiating factor from e.g. the configuration shown in FIG. 2(*d*), the configuration shown in FIG. 4(*a*)-4(*c*) does not use the bidirectional modulator 151 to be a 2 by 2 port device, like the MZM 153. Rather, the bidirectional modulator 151 that may be a 1 by 1 port device. Thus, the bidirectional modulator 151 may have only two operating ports.

FIG. 4(*d*), 4(*e*) show an alternate second configuration with which the number of lenses and couplers can be reduced. Here, an MZM 153 is used instead of the bidirectional modulator 151 as shown in FIG. 4(*a*)-(*c*). The MZM 153 has two ports on either side, as in FIGS. 2(*c*) and 2(*d*). FIG. 4(*d*) shows the input beam 400CI path and FIG. 4(*e*) the output beam 400C0 path. The MZM 153 has ports 141Au, 141Ad on one side of the MZM 153 and the MZM 153 has ports 141Bu, 141Bd on the other side of the MZM 153. Ports 141Au, 141Ad are complementary to each other and ports 141Bu, 141Bd are complementary to each other, in that light entering the MZM 153 either through ports 141Au or 141Ad exits the MZM 153 via ports 141Bu and 141Bd; light entering the MZM 153 through ports 141Bu or 141Bd exits the MZM 153 via ports 141Au and 141Ad. The polarity of the data (stream) applied to the light depends at which port 141Au, 141Ad, 141Bu, 141Bd the light enters and at which port 141Au, 141Ad, 141Bu, 141Bd it exits from. It is the same for pairs of input/output ports 141Au/141Bu, 141Ad/141Bd (wherein input and output can also be swapped). The other polarity is obtained for pairs of input/output ports 141Au/141Bd, 141Ad/141Bu (wherein input and output can also be swapped).

Light entering the MZM 153 from either port 141Au, 141Ad exits the MZM 153 from ports 141Bu, 141Bd and vice versa. The couplers 113A, 113B are configured as polarization splitting grating couplers, with output waveguides 120Au, 120Ad and 120Bu, 120Bd, respectively. They are further configured such that the light beams 400AI, 400BI split from light beam 400CI as received from optical fiber 200I are coupled to waveguides 120Au and 120Bd, and such that light passing waveguides 120Ad, 120Bu towards couplers 113A, 113B to be emitted as light beams 400AO, 400BO and passed as light beam 400CO, which comprises light beams 400AO, 400BO, to output optical fiber 200O. At least part of the light coupled from beam 400AI into waveguide 120Au transits to port 141Au. At least part of the light coupled from beam 400BI into waveguide 120Bd transits to port 141Bd. At least part of the light coupled out from the MZM 153 via port 141Ad transits to waveguide 120Ad. At least part of the light coupled out from the MZM 151, 153 via port 141Bu transits to waveguide 120Bu.

Notably, the second configuration shown in FIGS. 4(*d*) and 4(*e*) does not use Faraday rotators 500A, 500B compared to the first configuration as shown in FIG. 4(*a*)-4(*c*), where the (output) optical fiber 200O can also be used to transmit light beam 400CR towards the photonic interposer 300 by means of the lens 320CO. The light beam 400CR is then divided in the components comprising the light beams 400AR, 400BR which are then routed to one or several photodetectors (not shown in FIG. 4(*a*)-(*c*)).

As shown by FIGS. 4(*d*) and 4(*e*), it is thus possible to configure a photonic arrangement comprising a photonic integrated circuit 100 and an interposer 300, wherein lenses 320A, 320B of the interposer 300 serve to both couple beams 400AI and 400BI, each corresponding to one of the polarizations of a beam 400CI provided by fiber 200I, to the photonic integrated circuit 100, and to couple out the modulated beams 400AO and 400BO from the photonic integrated circuit 100 to the interposer 300 and from there to the output fiber 200O, without requiring Faraday rotators 500A, 500B.

There are further photonic integrate circuit configurations that allow this without the use of Faraday rotators. For example, couplers 110A, 110B may be dual polarization couplers that allow coupling both polarizations between free space and waveguides 120A, 120B. In such case, dual polarization coupler 110A may couple beam 400AI with a first polarization into waveguide 120A, after which the corresponding light is coupled to bidirectional modulator 151 via port 141A, exits bidirectional modulator 151 via port 141B, is coupled to dual polarization coupler 110B and emitted as modulated beam 400BO with the same first polarization as beam 400AI. Conversely, dual polarization coupler 110B may couple beam 400BI with a second polarization into waveguide 120B, after which the corresponding light is coupled to bidirectional modulator 151 via port 141B, exits bidirectional modulator 151 via port 141A, is coupled to dual polarization coupler 110A and emitted as modulated beam 400AO with the same second polarization as beam 400BI. This requires modulator 151 to be a dual polarization modulator in addition to being a bidirectional modulator. The overall function of the photonic integrated circuit 100 is then the same as for the photonic integrated circuit configuration shown in FIG. 4(*d*), 4(*e*).

A further possibility is to implement couplers 110A, 110B as polarization splitting grating couplers 113A, 113B, wherein coupler 113A is connected to waveguides 120A and 120C, and coupler 113B is connected to waveguides 120B and 120D. Beam 400AI is coupled to waveguide 120A by coupler 113A, corresponding light is further coupled to the input of a first modulator 150A whose output is either connected to waveguide 120C and from there back to coupler 113A or to waveguide 120D and from there to coupler 113B. Beam 400BI is coupled to waveguide 120B by coupler 113B, corresponding light is further coupled to the input of a second modulator 150B whose output is either connected to waveguide 120D and from there back to coupler 113B or to waveguide 120C and from there to coupler 113A. The overall function of the photonic integrated circuit 100 is then the same as for the photonic integrated circuit configuration shown in FIG. 4(*d*), 4(*e*). Consequently, interposer 300 shown in FIG. 4(*a*)-4(*e*) can also be used for packaging co-packaged optics without requiring bidirectional modulators, while still reducing the package size.

More generally, the photonic integrated circuit 100 can be adapted to any of the configurations shown in FIG. 2 to obtain this overall functionality compatible to interfacing with the photonic interposer 300 without requiring Faraday rotators.

These configuration have in common with FIGS. 4(*d*) and 4(*e*) that beam 400AI is received by coupler 110A, 113A with the opposite polarization with which beam 400AO is emitted and beam 400BI is received by coupler 110B, 113B with the opposite polarization with which beam 400BO is emitted. This is different from the configurations shown in FIGS. 4(*a*) to 4(*c*) that use Faraday rotators, in which beam 400AI is received by coupler 110A, 113A with the same polarization with which beam 400AO is emitted and beam 400BI is received by coupler 110B, 113B with the same polarization with which beam 400BO is emitted.

To facilitate manufacturing, interposers 300 in FIG. 4 have been shown as having a single polarization splitter-/combiner 310 both splitting beam 400CI into beams 400AI and 400BI and combining beams 400AO and 400BO into beam 400CO. However, the splitting and combining functions can also be done by separate polarization splitter-/combiners at the cost of increased manufacturing complexity and thus increased manufacturing cost.

FIG. 5 shows a glass building block 600 that can serve as a basic unit to build the herein described photonic interposer configurations. Lenses 602A to 602D serve to couple light to and from parallel couplers 110A1 to 110A4 of the photonic integrated circuit 100, that are connected to on-chip waveguides 120A1 to 120A4. This serves for example to connect four parallel transmitters and/or receivers, wherein the number of parallel ports can also be adapted to the requirements of the application. A cutline 611 serves to exemplify the cross-sections of the following figures. The surface 601 can be brought in mechanical contact with the photonic integrated circuit 100, in which case it also defines the distance between the lenses 602A to 602D to the couplers 110A1 to 110A4. This distance can essentially be the focal distance of each of lenses 602A to 602D. Similarly, the surface 601 can also be brought in mechanical contact (attached) to the optical fiber 200 as described above with reference to the other figures. The surface 601 is an attachment surface. In the following, we describe how photonic interposer configurations shown in FIGS. 1 and 4 can be built.

FIGS. 6(*a*), 6(*b*) and 6(*c*) exemplify an implementation of the photonic interposers with functionality as shown in FIG. 1 with the glass building block 600 as shown in FIG. 5, showing the structure in the plane defined by cutline 611.

FIG. 6(*d*) exemplifies implementation of the photonic interposer with functionality as shown in FIG. 4 with the glass building block 600. In some cases, some lenses are unused but still shown as being molded, to reduce the number of different piece parts in inventory and production flows. However, unused lenses can also be left out in order to reduce the production cost of the used molds. This applies in particular to lenses in building blocks 600D in the figures. Building blocks shown as being separated by dashed lines (e.g. building blocks 600A, 600B) can be molded in a same molding step into a same glass plate/glass wafer and may or may not be singulated prior to assembly in order to reduce the number of piece parts that are aligned and attached together. Surfaces that are coated or otherwise processed such as needed for polarization selective reflector/beam splitter-/combiners, wavelength selective reflectors/beam splitter-/combiners or other reflectors/beam splitter-/combiners are labeled in the figures with respective reference signs. Unlabeled surfaces through which beams are intended to propagate through may be attached to the other glass molded building block by means of index matched epoxy in order to minimize unwanted back-reflections.

FIG. 6(*a*) shows how the photonic interposer configuration shown in FIG. 1(*a*) can be built. Three building blocks are assembled. The lens in building block 600D is unused. Correspondences between the functions shown in FIG. 1(*a*) and the structures shown in FIG. 6(*a*) are indicated by common reference signs.

FIG. 6(*b*) shows how the photonic interposer configuration in FIG. 1(*b*) can be built. Two building blocks are assembled and correspondences are shown by common reference signs.

FIG. 6(*c*) shows an alternate embodiment of the functionality shown in FIG. 1(*b*). Two building blocks are assembled. The reflector 330 in FIG. 1(*b*) is implemented as 330A in FIG. 6(*c*). An additional second reflector 330B is needed due to the way the light is routed between lens 320C and polarization selective beam splitter-/combiner 310. The lens in building block 600D is unused.

FIG. 6(*d*) shows how the photonic interposer configuration in FIG. 4 can be built. Two building blocks are assembled. The correspondence between the functions shown in FIG. 4 and the structural elements in FIG. 6(*d*) are indicated by common reference signs.

Such photonic interposers can be placed densely next to each other on the surface of a photonic integrated circuit 100 and built of attached building blocks 600. FIG. 6(*e*) for example shows an array of photonic interposers such as shown in FIG. 6(*b*), 6(*c*) or 6(*d*) (with an additional building block 600D added to the configuration in 6(*b*) to enable fewer piece parts and handling of the top photonic interposer layer as a single block). The entire array (in two dimensions, including the dimension out of the plane of the figure for parallel optical ports, axis x in FIG. 5) can be built of two arrays of building blocks that remain non-singulated after molding and are manipulated as a block. These two arrays of building blocks can be stacked up as two layers on top of each other, as shown in FIG. 6(*b*)-6(*e*).

Importantly, most photonic interposer configurations shown here, except the one shown in FIG. 1(*a*)/6(*a*), can be made with only two piece parts, only one of which needs to be surface treated with coatings or otherwise processed for polarization selective beam splitter-/combiners or non-polarization-selective reflectors. Alternatively, processing for polarization selective beam splitter-/combiners 310 can be applied to one piece part and processing for other reflectors 330 to the other piece part. Processing for reflectors 330 may not be used, for example when corresponding surfaces are not attached to further building blocks, in which case total internal reflection may be sufficient to reflect the light.

In configurations in which the photonic interposers are densely stacked next to each other as in FIG. 6(*e*), a surface treatment for reflectors 330 may however be used as increased refractive index material (glass) will be present on both sides of the reflector. In some cases such as the configuration shown in FIG. 1(*b*), the reflector 330 is to reflect the polarization that is also reflected by a polarization selective beam splitter-/combiner 310, so that the same surface treatment may be applied for both, as a reflector 330 is only used to reflect polarizations that actually reach it. In other cases in which a reflector 330 is to reflect a polarization not reflected by a polarization selective beam splitter-/combiner 310, as e.g. reflector 330 in FIG. 6(*a*) or reflector 330A in FIGS. 6(*c*) and 6(*d*), a separate thin film stack or a metal coating may be used.

In case polarization selective beam splitter-/combiner 310 is implemented in MacNeille configuration with materials with refractive indices set such that beams 400 are incident on the coating with an angle corresponding to a Brewster angle, non-polarization-selective reflector 330 may be implemented with different materials such that the angle does no longer correspond to the Brewster angle. Consequently, both polarizations are then reflected. In case photonic interposers are made of two building blocks only, these are also referred to as the top and bottom layers in the following according to the drawings in FIG. 6(*a*)-(*e*). In FIG. 6(*a*), lens 320C and building block 600C are also considered to belong to the top layer and building block 600D is considered to belong to an intermediate layer.

In the configurations shown in FIG. 4(*a*)-(*e*), the lengths of waveguides 120A, 120B connecting couplers 110A, 110B to ports 141A, 141B of bidirectional modulator 151 may be adapted to equalize group delays after modulation between ports 141A, 141B and the optical fiber 200O for both beams 400AO, 400BO. Similarly, in the configuration shown in FIG. 4(*e*), the lengths of waveguides 120Ad, 120Bu connecting couplers 113A, 113B to ports 141Ad and 141Bu of bidirectional MZM 153 may be adapted to equalize group delays after modulation between ports 141Ad, 141Bu and fiber 200O for both beams 400AO, 400BO. In the configurations shown in FIGS. 1(*d*) and 4(*c*), the lengths of waveguides 120C and 120D connecting couplers 113A, 113B to a single or to separate photodiodes may be adapted to equalize group delays between the optical fiber 200O and the single or separate photodetectors for modulated beams 400AR, 400BR.

Such balancing of group delays may be used because the paths of light beams 400AO, 400BO through photonic interposer 300 are typically of different lengths, leading to differential group delays. These differential group delays can be equalized by sizing waveguides 120A, 120B with different lengths, to induce an opposite differential group delay for compensating the respective other group delay. Similarly, the paths taken by light beams 400AR, 400BR through photonic interposer 300 are typically of different lengths, which can be compensated by sizing the lengths of waveguides 120C and 120D differently. Typically, group delays may be balanced so that the remaining differential group delay between light beams 400AO, 400BO, as they reach output optical fiber 200O, should be less than 20% of a unit interval, wherein the unit interval is the duration of one symbol of the data stream. Similarly, remaining differential group delays between light beams 400AR, 400BR, as they reach a dual port photodetector or photodetector pair, should also be less than 20% of a unit interval in order to prevent significant link penalties.

This may be particularly critical when the signals are recombined in a single photodetector, since no further opportunity will then be given to equalize the group delays in the electrical domain. However, this may also be very advantageous in the case of separate photodetectors receiving the same data stream, as further equalization of the group delays in the electrical domain is then no longer necessary. If differential group delays are incurred in the electrical processing of signals generated from two distinct photodiodes, these may also be taken into account in the sizing of the waveguides 120C, 120D connecting the couplers 113A, 113B to the photodetectors, in order to equalize the overall group delays.

The configurations disclosed herein can be extended to wavelength division multiplexing (WDM), wherein wavelength multiplexing can be either handled at the photonic integrated circuit 100 or at the photonic interposer(s) 300. In case WDM is handled in the photonic integrated circuit 100, the light beams 400A, 400B, 400AI, 400BI, 400AO, 400BO, 400AR, 400BR may comprise multiple wavelengths. Light can then be split by wavelength, individually processed (detected or modulated), and, in case of a transmitter subsystem, recombined before being coupled to the output optical fiber 200O.

FIGS. 7(*a*) and 7(*b*) show two examples of how to manage wavelength diversity on a photonic integrated circuit 100 in a manner that is compatible with the photonic integrated circuit 100 and photonic interposer configurations shown in FIG. 1, 4(*a*)-4(*c*). FIG. 7(*c*) shows a further example how to manage wavelength diversity at the photonic integrated circuit 100 in a manner that is compatible with FIG. 4(*d*), 4(*e*).

FIG. 7(*a*) shows an embodiment of a bidirectional modulator 151 comprising two wavelength (de-)multiplexers □-MUX respectively connected to ports 141A/141C, 141B/141D on either side of the bidirectional modulator 151. In this example, the bidirectional modulator 151 has multiple bidirectional modulators 151A-151D, each modulating one out of several (here 4) wavelengths. The group delays inside that structure are balanced by design. Alternatively, the array of bidirectional modulators 151A-151D can be replaced by an array of two port photodetectors (or pairs of photodetectors with one port each).

An alternate implementation of the same functionality is shown in FIG. 7(*b*). Instead of the (de-)multiplexers □-MUX, an array of add-drop multiplexers (OADMs) 170A-170D, that may be implemented with ring resonators, is used instead, each OADM being tuned to a specific wavelength. They route light with a given wavelength coming from both ports 141A/141C and 141B/141D to their two complementary drop ports and from there to two inputs of one of the bidirectional modulators 151A-151D or one of the two inputs of a dual input photodetector/photodetector pair. In case of a transmitter, the outputs of bidirectional modulators 151A-151D are routed back to ports 141A/141C and 141B/141D via the OADMs 170A-170D. By sizing the waveguides connecting the two ports of the modulators 151A-151D or photodetectors to the OADMs 170A-170D, the group delays can be balanced for the two polarization paths of each of the WDM channels. This balancing can be configured as in PCT patent application WO2016150522A1 entitled "Wdm comb source based optical link with improved optical amplification" by Jeremy Witzens, Florian Merget and Juliana Mueller, which is incorporated by reference herein in its entirety.

FIG. 7(*c*) shows an extension of FIG. 7(*a*) compatible with the photonic interposer and chip configuration as shown in FIG. 4(*d*), 4(*e*). Since herein each of the bidirectional MZMs 153(A-D) couple light out from ports complementary to those through which light was coupled in, two additional wavelength (de-) multiplexers are used to combine the modulated light and send it to waveguides 120Ad and 120Bu via ports 141Ad and 141Bu. This entire bidirectional modulator comprising MZMs 153A-153D then replaces the bidirectional MZM 153 as shown in FIGS. 4(*d*) and 4(*e*). The direction of light in waveguides 120Au, 120Ad, 120Bu, 120Bd can be the same as in FIG. 4(*d*), 4(*e*).

Due to manufacturing tolerances and the thermo-optic coefficients of utilized materials, on-chip wavelength selective devices such as multiplexers □-MUX or OADMs 170 may use power hungry and difficult to control phase tuners. Moreover, when couplers 110A, 110B are implemented as grating couplers, that typically have optical passbands limited to a few tens of nanometers, it may be difficult to fit all targeted wavelengths within the passband of the grating couplers and significant insertion losses may then be incurred. For example, coarse WDM O-band datacom transceivers are typically operated with 4 wavelengths that are each 20 nm apart. Including typical allowable tolerances on the wavelengths of 13 nm, these fill a total of 73 nm that is very difficult to couple with a single grating coupler without complex processing or significant performance impairments. As the number of wavelength multiplexed channels increases, this problem will be further exacerbated. To avoid these issues, it is advantageous to handle polarization multiplexing and demultiplexing in the photonic interposer. Wavelengths or groups of wavelengths can then be split from or combined with each other inside the photonic interposer, reducing the used passband of couplers as well as the complexity of on chip wavelength (de-)multiplexers (if any, as for example when the photonic interposer splits/combines groups of wavelengths that are then further processed on the chip). Different couplers can then be utilized at different positions on the chip, each adapted such that its low insertion loss passband contains the wavelengths coupled in or out of the chip at that position.

FIG. 8(*a*) shows a cell of building blocks 600 that can be used to implement a photonic interposer that combines the functionalities shown in FIGS. 1 and 4 with WDM multiplexing and demultiplexing. One such cell is used per multiplexed wavelength. If light at a wavelength λn is injected in the photonic interposer 300 via lens 320CI-λn, it is split by polarization selective beam splitter-/combiner 310-λn that routes light beams having one polarization, typically the p-polarization, to lens 320A-λn and light beams having the other polarization to lens 320B-λn. Polarization selective beam splitter-/combiner 310-λn is typically configured to reflect light beams having one polarization of wavelength (or within group of wavelengths) λn, to transmit light beams having the other polarization of wavelength (or within group of wavelengths) λn, and to transmit light beams having other wavelengths λm different from (or outside group of wavelengths) λn that are intended to propagate through it (see below). The light beam 400BI-λn, that corresponds to the part of the input light reflected by the polarization selective beam splitter-/combiner 310-λn, is first incident onto wavelength selective beam splitter-/combiner 340-λn configured at least to reflect light beams having the polarization of λn also reflected by polarization selective beam splitter-/combiner 310-λn, but which may also be configured to reflect light beams having both polarizations of wavelength λn. The wavelength selective beam splitter-/combiner 340-λn is further configured to transmit light beams having other wavelengths λm different from λn that are to propagate through it. Light beams 400AI-λn and 400BI-λn are further focused by lenses 320A-λn and 320B-λn onto couplers 110A and 110B of the photonic integrated circuit 100. Wavelength selective beam splitter-/combiners may also be referred to as wavelength selective reflectors herein.

If light is sent back into the photonic interposer through lenses 320A-λn and 320B-λn with the same polarization at these lenses 320A-λn and 320B-λn, it is routed back to lens 320CI-λn. However, if light is sent back through these lenses 320A-λn and 320B-λn with the opposite polarization as the one with which it would have arrived in the description above, i.e., if the polarizations are switched, returning light beams 400AO-λn, 400BO-λn are instead routed to wavelength selective beam splitter-/combiner 340-λ(n−1). This means that light beam 400BO-λn is reflected by wavelength selective beam splitter-/combiner 340-λn, i.e., that wavelength selective beam splitter-/combiner 340-λn reflects both polarizations at wavelength or group of wavelengths λn. Due to the switched polarizations, light beam 400BO-λn is transmitted by polarization selective beam splitter-/combiner 310-λn and light beam 400AO-λn is reflected by polarization selective beam splitter-/combiner 310-λn, such that both light beams arrive at wavelength selective beam splitter-/combiner 340-λ(n−1).

Beams 400AR-λn, 400BR-λn can also enter the structure from the right, at wavelength selective beam splitter-/combiner 340-λ(n−1). Beam 400AR-λn is chosen to have the polarization that gets reflected by polarization selective beam splitter-/combiner 310-λn and beam 400BR-λn then has the polarization that gets transmitted by polarization selective beam splitter-/combiner 310-λn. Wavelength selective beam splitter-/combiner 340-λn reflects beam 400BR-λn and routes it to lens 320B-λn. Beams 400AR-λn and 400BR-λn are thus routed via lenses 320A-λn and 320B-λn to couplers 110A and 110B of the photonic integrated circuit 100. Since wavelength selective beam splitter-/combiner 340-λn reflects a polarization of wavelength λn that is not reflected by polarization selective beam splitter-/combiner 310-λn, these two reflectors are implemented by a different surface treatment. For example, if polarization selective beam splitter-/combiner 310-λn is formed by a thin film coating with the refractive index of the constituting materials chosen such that beams are incident with the Brewster angle, so that the p-polarization is transmitted through, wavelength selective beam splitter-/combiner 340-λn may be formed by a similar thin film stack with similar or same wavelength selectivity, but whose materials were chosen to have different refractive indices than those of the polarization selective beam splitter-/combiner 310-λn, such that the incidence angle of the light beams no longer correspond to their Brewster angle and light beams having both polarizations of λn are being reflected. The thickness of thin films in wavelength selective beam splitter-/combiner 340-λn and in polarization selective beam splitter-/combiner 310-λn are adjusted to the refractive indices of their constitutive materials.

The nomenclature herein and in the following has the following convention of reference signs: Beams are labeled by wavelength, i.e., beams 400AI/O/R-λn and 400BI/O/R-λn are at wavelength λn or comprise a group of wavelengths centered at λn. Lenses are labeled with −λn according to which cell they are a part of. Lenses 320CI-λn, 320A-λn and 320B-λn are all part of the same cell as polarization selective beam splitter-/combiner 310-λn that splits light beams of wavelength λn, or of wavelengths relatively close to λn. Polarization selective beam splitter-/combiners 310-λn are configured to split light beams having polarizations of wavelength λn or of wavelengths relatively close to λn. Light beams having other wavelengths arriving at this reflector are typically transmitted through. Consequently, polarization selective beam splitter-/combiners in FIG. 8(*a*)-(*f*) are polarization and wavelength selective beam splitter-/combiners, but are referred to simply as polarization selective beam splitter-/combiners herein for brevity.

Wavelength selective beam splitter-/combiner 340-λn are configured to reflect light beams having any polarization of wavelength λn, or of wavelengths relatively close to λn, that arrive at the reflector. In configurations in which light beams having both polarizations λn arrive at the reflector, this means that these beams with both polarizations are being reflected. Light beams having other wavelengths arriving at this beam splitter-/combiner are typically transmitted without reflection, irrespectively of their polarization. As already briefly discussed above, selective beam splitter-/combiner 310-λn and 340-λn can typically be implemented as thin film coatings with individual film thicknesses chosen such that they lead to constructive back-reflection for light beams at wavelength λn, or wavelengths close to λn, leading to a strong reflection, but such that they lead to weak reflection of light beams at other wavelengths λm arriving at the selective beam splitter-/combiner. As an additional condition, beams may pass through the thin film stack at or sufficiently close to the Brewster angle for polarization selective beam splitter-/combiner 310-λn, but not close to the Brewster angle for wavelength selective beam splitter-/combiner 340-λn.

FIG. 8(*b*) shows how several such cells can be arranged in order to form a photonic interposer that (de-)multiplexes light beams with several wavelengths, here exemplarily chosen as λ1, λ2, λ3 (or as groups of wavelengths centered on λ1, λ2, λ3), as well as splits/combines and handles their polarizations in a manner compatible with the configurations shown in FIGS. 1 and 4. From left to right, cells with selective beam splitter-/combiners adjusted to λ1, λ2, and λ3 are arranged next to each other and can be fabricated with only two layers as building blocks separated by dashed lines may or may not be singulated and can be transferred as a single piece part. Only the leftmost (λ1) and rightmost (λ3) cells are modified from the generic cell described with respect to FIG. 8(*a*), so that more of these generic cells, adjusted to further wavelengths, can be inserted in between to increase the number of wavelengths that can be handled. The leftmost cell can actually be taken as represented in FIG. 8(*a*), however, since only a single wavelength transits at this point, the wavelength selective beam splitter-/combiner 340-λ3 can be replaced by a simple non-selective reflector 330 without loss of functionality. In the rightmost cell, a reflector 330B reflects all beams present at this point and can also be implemented as a simple non-selective reflector. It routes light to and from lens 320CO that is shared by all the light beams 400CO-λn, 400CR-λn, where 400CO-λn corresponds to the combined beams 400AO-λn and 400BO-λn after combining by the interposer 300, 400CR-λn corresponds to the combined beams 400AR-λn and 400BR-λn prior to splitting by the interposer 300.

Light with different polarizations and wavelengths λ1, λ2, λ3 can for example enter the photonic interposer through lens 320CO as light beams 400AR-λn with one polarization and one of the wavelengths and light beams 400BR-λn with the other polarization and one of the wavelengths. Light beams 400AR-λn are then routed to lenses 320A-λn and light beams 400BR-λn to lenses 320B-λn. This is for example the case if light beams 400AR-λn are s-polarized and light beams 400BR-λn are p-polarized, and polarization selective beam splitter-/combiners 310-λn are implemented in MacNeille configuration. If light beams 400AO-λn, 400BO-λn are injected via lenses 320A-λn, 320B-λn with opposite polarizations (e.g. s-polarization for lenses 320A-λn/beams 400AO-λn and p-polarization for lenses 320B-λn/beams 400BO-λn), light is routed back to lens 320CO.

Thus, this photonic interposer fulfills the same functionality as the photonic interposers shown in FIG. 1, in addition to splitting and combining wavelengths, so that all functionalities associated to FIG. 1 can also be implemented with it in addition to wavelength (de-)multiplexing. In particular, corresponding configurations of the photonic integrated circuit 100 and of Faraday rotators, if used, also apply. Lens 320CO (FIG. 8(*b*)) then plays the role of lens 320C (FIG. 1). Lenses 320A-λn, 320B-λn play the roles of lenses 320A, 320B and couplers 110A-λn, 110B-λn play the roles of couplers 110A, 110B on a wavelength channel specific basis.

If light is instead injected at wavelength λn through lenses 320A-λn and 320B-λn with opposite polarizations, for example the p-polarization for lenses 320A-λn and the s-polarization for lenses 320B-λn, it is instead routed to lenses 320CI-λn. Conversely, if beams 400CI-λn are injected through lenses 320CI-λn, they are split into beams 400AI-λn and 400BI-λn by polarization selective beam splitter-/combiners 310-λn, and routed to lenses 320A-λn and 320B-λn with the opposite polarization at the lens than if light had been injected through lens 320CO.

Thus, this photonic interposer can fulfill the same functionality as the one shown in FIG. 4 in addition to wavelength multiplexing and demultiplexing. Lens 320CO (FIG. 8(*b*)) then plays the role of lens 320CO (FIG. 4), lenses 320A-λn, 320B-λn play the role of lenses 320A, 320B on a wavelength channel specific basis and lenses 320CI λn play the role of lens 320CI on a wavelength channel specific basis. This configuration is advantageous for example if external lasers provide light beams at one wavelength each which are routed with scrambled polarization by single mode fibers to lenses 320CI-λn. Light is then routed in a wavelength and polarization selective way to lenses 320A-λn, 320B-λn, modulated on a photonic integrated circuit 100 according to configurations shown in FIG. 4, routed back to lenses 320A λn, 320B-λn with opposite polarizations than the initially incident light, and from there to lens 320CO. From there it is routed to a fiber 200O that may be connected to another transceiver. As already explained above and also shown in FIG. 4, modulated light incoming from the optical fiber 200O can also be routed to lenses 320A-λn, 320B-λn according to wavelength and polarization and from there to wavelength specific receiver subsystems via waveguides 120C-λn and 120D-λn. In particular, configurations of the photonic integrated circuit 100 shown in FIG. 4 and disclosed in its description also apply here.

In order to reduce the number of fibers that are connected to the co-packaged transceiver, or if a comb source is used as an external laser/external multi-wavelength light source, it may be advantageous to introduce the light not through multiple wavelength specific input ports 320CI-λn, but through a single multi-wavelength input port 320CI. FIGS. 8(*c*) and 8(*d*) show how this can be accomplished. The cell from FIG. 8(*a*) is modified into the cell shown in FIG. 8(*c*), that comprises a third (intermediate) layer having a building block 700 of another type (referenced in the following as 700A-700C and 700A-λn-700C-λn, respectively) as depicted in the figure. This allows adding a further layer of beam splitter-/combiners, here primarily wavelength selective beam splitter-/combiners 340B-λn, in order to allow additional processing of the light. The light beams 400CI-λn that are previously provided by individual wavelength specific lenses, are all provided by one lens 320CI, split by wavelength selective beam splitter-/combiners 340B-λn in the additional, upper layer of beam splitter-/combiners in order to route them to the polarization selective beam splitter-/combiners 310-λn in individual cells. It should be noted that as for the configurations shown in FIG. 4, the roles of ports defined by lenses 320CI, 320CO can be swapped (i.e., swapping the port supplying the unmodulated carriers at different wavelengths, the input port, and the port connected to the downstream transceiver, the output port) by inverting the direction of rotation of the Faraday rotators or by reorienting the couplers 110A-λn, 110B-λn on the photonic integrated circuit 100.

Since wavelength selective beam splitter-/combiners (dichroic mirrors) are typically configured to switch between reflection and transmission mode as the wavelength is increased above or reduced below a predetermined (critical) wavelength (so-called longpass or shortpass dichroic mirrors), it may be advantageous to order wavelengths associated to the cells in ascending or descending (i.e., monotonous) order as one moves from left to right through the structures as depicted in FIGS. 8(*b*), 8(*d*) and 8(*f*). For example, in FIG. 8(*b*), beam splitter-/combiners 310-λ1, 340-λ1 selectively or fully reflect light beams having wavelength λ1, but let light beams having wavelengths λ2 and λ3 through, beam splitter-/combiners 310-λ2 and 340-λ2 selectively or fully reflect light beams having wavelength λ2, but let light beams having wavelength λ3 through (light beams having wavelength λ1 have already been fully dropped), etc. Thus, a critical wavelength can be defined for each wavelength selective beam splitter-/combiner above/below which it is used to change between reflection and transmission mode. More complex to implement multi-band filters that have multiple reflection or transmission bands are not used.

Similar considerations hold for the upper layer of wavelength selective beam splitter-/combiners 340B-λn in FIG. 8(*d*), formed at the junction of the intermediate and the upper piece part, in that a predetermined (critical) wavelength can be defined for each wavelength selective beam splitter-/combiner above/below which it is used to change between reflection and transmission mode. However, on closer inspection, this configuration in not optimal because the order in which wavelengths are being added or dropped to the buses, defined as the horizontal beams in the figure, is opposite when starting from the main ports defined by lenses 320CI, 320CO. Indeed, while wavelength selective beam splitter-/combiner 340A-λ1 reflects light beams having wavelength λ1 and passes light beams having wavelengths λ2 and λ3 through, the first wavelength selective beam splitter-/combiner 340B-λ3 (in the light path after lens 320CI) reflects light beams having wavelength λ3 and passes light beams having wavelengths λ1 and λ2 through. In other words, if the wavelength selective beam splitter-/combiner 340A-λn are shortpass dichroic mirrors, the wavelength selective beam splitter-/combiner 340B-λn may need to be longpass dichroic mirrors and vice versa. To facilitate manufacturing, it may be preferable, however, if the wavelength selective beam splitter-/combiner used in the two layers of beam splitter-/combiner, one formed at the junction of the lower and of the intermediate piece part and the other formed at the junction of the intermediate and of the upper piece part, are of a same type.

This can be accomplished with the modified configuration shown in FIGS. 8(*e*) and 8(*f*), in which the geometry of the intermediate layer of building blocks (referenced with reference numeral 800 and 800-λn respectively) has been modified and the order in which light beams with specific wavelengths are dropped to or added back from the photonic integrated circuit 100 is the same following the light beam path from lenses 320CI, 320CO. This is a consequence of lenses 320CI, 320CO being on the same side of the structure, with cells dedicated to processing wavelengths λn being on the other side. It can be seen in particular that wavelength selective beam splitter-/combiner 340A-λn and 340B-λn have exactly the same function for each wavelength λn or groups of wavelengths close to λn, reducing the number of different thin film coating types that have to be deposited (or other surface treatments that have to be applied), thus greatly facilitating manufacturing. In particular, for a given λn, beam splitter-/combiner 340A-λn and 340B-λn may be of a same type. If the different piece parts/building blocks that need to be coated are initially molded in a same glass preform/glass wafer/glass plate, they can even be coated at the same time prior to singulation.

In another embodiment, an optical interposer 300 for coupling light between a photonic integrated circuit 100 and an optical fiber 200O combines four outgoing beams 400AO-λ1, 400BO-λ1, 400AO-λ2, 400BO-λ2 emitted by the photonic integrated circuit 100 into a beam 400CO coupled to the optical fiber 200O, or splits a beam 400CR emitted by the optical fiber 200O into four incoming beams 400AR-λ1, 400BR-λ1, 400AR-λ2, 400BR-λ2, a first and second outgoing beam 400AO-λ1, 400BO-λ1 have a same wavelength λ1 and different polarizations, a third and fourth outgoing beam 400AO-λ2, 400BO-λ2 have a same wavelength λ2 different from λ1 and different polarizations, or a first and second incoming beam 400AR-A1, 400BR-λ1 have a same wavelength λ1 and different polarizations, a third and fourth incoming beam 400AR-λ2, 400BR-λ2 have a same wavelength λ2 different from λ1 and different polarizations, the optical interposer 300 comprises:

a first polarization selective beam splitter-/combiner 310-λ1 adapted to either combine first and second outgoing beams 400AO-λ1, 400BO-λ1 or beams passed on therefrom, or to split a beam into first and second incoming beams 400AR-λ1, 400BR-λ1 or beams passed on thereto, a second polarization selective beam splitter-/combiner 310-λ2 adapted to either combine third and fourth outgoing beams 400AO-λ2, 400BO-λ2 or beams passed on therefrom, or to split a beam into third and fourth incoming beams 400AR-λ2, 400BR-λ2 or beams passed on thereto, a wavelength selective beam splitter-/combiner 340-λ1 adapted to either combine a beam with at least a wavelength λ1 and a beam with at least a wavelength 12 into a single beam or to split a beam with wavelengths λ1 and λ2 into two beams so that only one split beam has a wavelength λ1 and only one split beam has a wavelength λ2, wavelength selective beam splitter-/combiner 340-λ1 is in a same layer as first and second polarization selective beam splitter-/combiners 310-λ1, 310-λ2.

This embodiment of the photonic interposer may further comprise a first, second, third and fourth lens 320A-λ1, 320B-λ1, 320A-λ2, 320B-λ2; the first lens 320A-λ1 couples first incoming beam 400AR-λ1 to the photonic integrated circuit 100 or couples first outgoing beam 400AO-λ1 from the photonic integrated circuit 100; the second lens 320B-λ1 couples second incoming beam 400BR-λ1 to the photonic integrated circuit 100 or couples second outgoing beam 400BO-λ1 from the photonic integrated circuit 100; the third lens 320A-12 couples third incoming beam 400AR-λ2 to the photonic integrated circuit 100 or couples third outgoing beam 400AO-λ2 from the photonic integrated circuit 100; the fourth lens 320B-λ2 couples fourth incoming beam 400BR-λ2 to the photonic integrated circuit 100 or couples fourth outgoing beam 400BO-λ2 from the photonic integrated circuit 100, the first, second, third and fourth lenses may have focal distances adapted according to the optical path length between them and the optical fiber 200O.

Another embodiment of a photonic arrangement comprises the photonic interposer 300 described above and a photonic integrated circuit 100, and the photonic interposer 300 provides a photonic interface between the photonic integrated circuit 100 and an optical fiber 200O; and the photonic integrated circuit 100 has a plurality of couplers 110A-λ1, 110B-λ1, 110A-λ2, 110B-λ2; 113A-λ1, 113B-λ1, 113A-λ2, 113B-λ2 including a first coupler 110A-λ1; 113A-λ1, a second coupler 110B-λ1; 113B-λ1, a third coupler 110A-λ2; 113A-λ2 and a fourth coupler 110B-λ2; 113B-λ2 which are arranged with respect to the first, second, third and fourth lenses 320A-λ1, 320B-λ1, 320A-λ2, 320B-λ2 of the photonic interposer 300 and whose orientation may be chosen according to the polarization of the emitted first, second, third and fourth outgoing beams or the received first, second, third and fourth incoming beams.

The photonic integrated circuit 100 may be further adapted to modulate a first data stream onto the first and second outgoing light beams 400AO-λ1, 400BO-λ1 and to modulate a second data stream onto the third and fourth outgoing light beams 400AO-λ2, 400BO-λ2; the first and second data streams are different from each other.

The photonic integrated circuit 100 may be further adapted to transduce first and second incoming light beams 400AR-λ1, 400BR-λ1 into a single electrical data stream and to transduce third and fourth incoming light beams 400AR-λ2 400BR-λ2 into another single electrical data stream.

In FIGS. 1 and 4, surface emitting (receiving) couplers have been drawn as emitting (receiving) beams propagating along the surface normal of the photonic integrated circuit 100. Such couplers are however typically implemented as grating couplers that emit or receive light at a finite angle relative to the surface normal. In this case, the couplers 110A, 110B typically remain centered on the optical axis of the associated lenses 320A, 320B. However, lenses 320A/320B and couplers 110A/110B may be jointly displaced along the directions of the surface of the photonic integrated circuit 100, by adjusting the molds for the glass building blocks and the masks for the photonic integrated circuit 100, in order accommodate the emission/reception angle of the couplers. If the rays stay as drawn in the photonic interposers, but the lenses are displaced, the rays are sent to the chip with a different direction, accommodating the emission/reception angle of the couplers. Beams may then propagate along axes inside the photonic interposer that are parallel, but displaced relative to the main optical axis of the corresponding lens, leading to an angled beam outside of the photonic interposer after the lens. Since grating couplers or other couplers are oriented in different directions on the photonic integrated circuit 100, the displacements are not the same in all the building blocks 600 even if the couplers are otherwise identical. Moreover, in a wavelength division multiplexed system using photonic interposers as depicted in FIG. 8, it may be advantageous to configure grating couplers 110A, 110B or polarization splitting grating couplers 113A, 113B, adapted to receive or emit light at wavelength λn or at wavelengths relatively close to λn, to have different emission angles depending on which wavelength(s) they are adapted to. This can be advantageous to minimize insertion losses, as the efficiency of grating couplers also depends on the phase of reflections from dielectric interfaces above or below the grating couplers. Such reflections can for example occur at the top of the dielectric back-end-of-line stack of the photonic integrated circuit 100, or at an oxide silicon handle interface of silicon-on-insulator chips. Since the phase of these reflections depend on both the wavelength λn and the emission angle, a change in emission angle can be used to compensate for a change in wavelength while maintaining high coupling efficiency. Different emission angles for couplers optimized for different wavelengths can also be accommodated by displacing the couplers 110A-λn, 110B-λn and lenses 320A-λn and 320B-λn together.

In order to not have to singulate and rearrange building blocks that could otherwise stay attached to each other (i.e., if they are in the same photonic interposer layer), they can directly be arranged in the correct order with the correct lens displacements on the molds. Similar considerations apply to building blocks in the topmost layer interfacing with optical fibers 200, 200I, 200O. However, since fibers can all be of the same type with the same surface polish angle, the building blocks in the top layer interfacing with fibers may all be of the same type with identical lens positions. Optical fibers 200, 200I, 200O may be encased in fiber arrays. In this case, the entire fiber array may be attached to the photonic interposer, allowing fixating several fibers at once. In this case, parallel optical fibers 200 of the same fiber arrays may be arranged in the direction perpendicular to the cut plane in which FIGS. 1, 4, 6 and 8 are represented (x-axis in FIG. 5).

The configurations shown in FIGS. 1(*d*) and 4(*c*) involving light returning from the output optical fiber 200O may use the same wavelength for outgoing beams 400AO, 400BO as for incoming beams 400AR, 400BR. However, transmitted and received light may also have different wavelengths. If these wavelengths are relatively close, it is straightforward to design a thin film coating for polarization selective beam splitter-/combiner 310 such that the functionality of the polarization selective beam splitter-/combiner is obtained at both wavelengths. In this case, these two wavelengths are also considered to belong to a group of wavelengths centered at λn for polarization selective beam splitter-/combiners 310-λn. In case of two wavelengths, polarization splitting grating couplers 113A, 113B may be adapted to handle these two wavelengths. For example, if 113A, 113B are implemented as polarization splitting grating couplers, the pitch of the gratings in the direction along the axis of waveguides 120A, 120B can be chosen to be different from the pitch in the direction along the axis of waveguides 120C, 120D, in order to take into account that waveguides 120A, 120B carry light at a different wavelength than waveguides 120C, 120D. In other words, the pitch of the polarization splitting grating coupler is different along its two principal axes, defined as the main optical axes along which beams are injected to or received from the two waveguides connected to the polarization splitting grating coupler. The two principal axes can, but do not need to be, orthogonal to each other.

If couplers 110A, 110B emit beams with similar mode profiles to optical fibers 200, 200O, 200I, the field can be mapped between couplers 110A, 110B and optical fibers 200, 200O, 200I relatively straightforwardly with a pair of collimating/focusing lenses, and the lenses may be of identical design in all building blocks for simplicity.

If a light beam transformation is used, it may be advantageous to use lenses with different focal lengths in the top or bottom layers in order to transform the mode field diameters. In that case, the distance of the lenses to the attachment surface 601 of building blocks 600 may also be different for building blocks in the top and in the bottom piece parts of the photonic interposer, according to the focal distances of the lenses. In applications in which the couplers 110A, 110B are topside on the photonic integrated circuit 100, the focal plane of lenses 110A, 110B may also be close to the plane formed by surface 601 as shown FIG. 5, since this is the plane where the couplers will be located. However, packaging solutions may be advantageous in which photonic interposers 300 are attached to the backside of the photonic integrated circuit 100, opposite to the one in which surface couplers are implemented. These couplers then send beams to/receive beams from the direction towards the substrate of the photonic integrated circuit 100 implemented as a chip.

This may be the case when the photonic integrated circuit 100 is flip-chip attached onto a common substrate with driver/receiver electronics and/or a digital chip such as a switch chip and the interposer 300 finally attached on top. Such a configuration can for example be found in N. Mangal, J. Missinne, G. Van Steenberge, J. Van Campenhout, B. Snyder, "Performance Evaluation of Backside Emitting O-Band Grating Couplers for 100-μm-Thick Silicon Photonics Photonic interposers," IEEE Photonics Journal, vol. 11, no. 3, Art. ID 7101711, June 2019, which is incorporated by reference herein in its entirety. In this case, the lenses 320A, 320B may focus the light at a separate plane distant from surface 601 by about the thickness of the chip, which can be obtained by modifying the focal lengths of respective lenses 320A, 320B, 320C, 320CI, 320CO, or a combination of these. Alternatively, couplers can be focusing couplers such as focusing grating couplers adapted to focus the emitted light to a point towards the backside of the chip, closer to the surface 601 through or at which the photonic interposer is attached. Further, focusing of light to that point by the photonic interposer can be achieved by modifying the focal length of the lenses.

More complex beam shaping transformations serving to reduce the mismatch between coupler and optical fiber emission field profiles may be achieved by using asymmetric lenses or by defining static phased arrays in interface planes between glass building blocks through which beams are transmitting. Such phased arrays can for example be defined by locally etching into the glass building blocks and backfilling the voids with another material with a different refractive index (including non-index matched epoxy during assembly) or by depositing another material on the glass building blocks and structuring the same. Accordingly, local phase changes can be applied to the light propagating through and the light beam profile at the couplers 110A, 110B transformed to that of the optical fibers 200, 200I, 200O.

In the interposer configurations shown in this disclosure, optical beam paths between pairs of lenses can be of different lengths, depending on which fiber and which coupler of the photonic integrated circuit light is being received from/coupled to. This is further exacerbated in optical interposers handling a large number of wavelengths following the configurations shown in FIG. 8(*b*), 8(*d*), 8(*f*). In order to reduce resulting insertion losses, it may thus be advantageous to adapt the focal length of the lenses coupling light to/from the couplers of the photonic integrated circuit according to the lengths of these beam paths.

At this point it should be noted that all of the above-described parts are considered to be essential to the invention when viewed on their own and in any combination, especially the details shown in the figures. Modifications of this are familiar to the skilled person.

The invention claimed is:

1. A photonic arrangement comprising:

a photonic interposer; and a photonic integrated circuit comprising a plurality of couplers including a first coupler and a second coupler which are arranged with respect to first and second lenses of the photonic interposer and to respectively receive first and second light beams, and the photonic integrated circuit is adapted to modulate a same data stream on the first and second light beams, wherein the photonic interposer is arranged at the photonic integrated circuit to provide a photonic interface between a first optical fiber and the photonic integrated circuit as well as between the photonic integrated circuit and a second optical fiber, wherein the photonic interposer comprises:

a polarization selective beam splitter-/combiner configured to:

split an input light beam with first and second polarizations, from the first optical fiber, into a first light beam and a second light beam and to redirect one of the first and second light beams, wherein the first light beam has the first polarization and the second light beam has the second polarization which is different from the first polarization; and combine modulated first and second light beams from the photonic integrated circuit into a combined light beam to be coupled to the second optical fiber, wherein the modulated first and second light beams are respectively subject to the first and second light beams being modulated by a same data stream, by the photonic integrated circuit.

2. The photonic arrangement of claim 1, further comprising a plurality of reflectors, wherein the plurality of reflectors are arranged in a same layer; or the plurality of reflectors and the polarization selective beam splitter-/combiner are arranged in a same layer, and the polarization selective beam splitter-/combiner is arranged in a light path between the plurality of reflectors.

3. The photonic arrangement of claim 2, wherein the plurality of reflectors and the polarization selective beam splitter-/combiner are arranged at a same angle.

4. The photonic arrangement of claim 1, wherein the photonic interposer comprises a plurality of lenses; and wherein the plurality of lenses are adapted to at least one of:

form respective interfaces between the photonic interposer and the first and second optical fibers, and form respective interfaces between the photonic interposer and the photonic integrated circuit.

5. The photonic arrangement of claim 4, wherein the photonic interposer comprises a plurality of lenses having first and second lenses being adapted to respectively couple the first and second light beams from the photonic interposer to the photonic integrated circuit; and wherein the first and second lenses are adapted to respectively couple the modulated first and second light beams from the photonic integrated circuit to the photonic interposer.

6. The photonic arrangement of claim 4, wherein the plurality of lenses have third and fourth lenses adapted to operate as input port and output port of the photonic interposer, respectively.

7. The photonic arrangement of claim 6, wherein the first and second lenses and the third and fourth lenses are arranged opposite to each other.

8. The photonic arrangement of claim 6, wherein the first and second lenses are arranged in different layers than the third and fourth lenses.

9. The photonic arrangement of claim 6, wherein the first lens and the third lens have one and the same central axis, and a central axis of the second lens differs from a central axis of the fourth lens.

10. The photonic arrangement of claim 1, wherein the photonic interposer comprises first and second Faraday rotators adapted to adjust the respective polarization of the first and second light beams and to couple the first and second light beams with the respectively adjusted polarization between the first and second lenses and respective couplers of the photonic integrated circuit.

11. The photonic arrangement of claim 1, wherein the photonic integrated circuit is adapted to transmit the modulated first and second light beams under use of the respective first and second couplers.

12. The photonic arrangement of claim 1, wherein the first coupler is adapted to receive the first beam and to emit the modulated first beam at one and the same first polarization;

wherein the second coupler is adapted to receive the second beam and to emit the modulated second beam at one and the same second polarization; or the first coupler is adapted to receive the first beam and to emit the modulated first beam at opposite polarizations; and wherein the second coupler is adapted to receive the second beam and to emit the modulated second beam at opposite polarizations.

13. The photonic arrangement of claim 1, wherein the photonic arrangement comprises first and second Faraday rotators arranged between first and second lenses and the first and second couplers, respectively, and adapted to adjust the polarization of the first and second light beams, respectively, and adapted to couple the first and second light beams with the adjusted polarizations between the first and second lenses and the first and second couplers of the photonic integrated circuit, respectively.

14. A method of manufacturing a photonic interposer according to claim 1, the method comprises:

providing a plurality of glass molded building blocks;

forming a plurality of layers by coating at least one of the plurality of glass molded building blocks with one or more thin film coatings; and forming the photonic interposer by assembling at least two glass molded building blocks.

15. The photonic arrangement of claim 1, further comprising a plurality of reflectors, wherein the plurality of reflectors are arranged in a same layer, the plurality of reflectors and the polarization selective beam splitter-/combiner are arranged in a same layer, and the polarization selective beam splitter-/combiner is arranged in a light path between the plurality of reflectors.

16. The photonic arrangement of claim 1, further comprising a plurality of reflectors, wherein at least one of the plurality of reflectors and the polarization selective beam splitter-/combiner are arranged in a same layer.

17. The photonic arrangement of claim 10, wherein the first and second Faraday rotators are non-reciprocal elements.

18. The photonic arrangement of claim 10, wherein the first and second Faraday rotators are configured to rotate the respective polarization of the first and second light beams by 45 degrees.

19. The photonic arrangement of claim 10, wherein the modulated first and second light beams are received by the first and second lenses of the photonic interposer from the respective couplers of the photonic integrated circuit, wherein the polarization of the modulated first and second light beams are rotated by 90 degrees with respect to the polarization of the first or the second light beam coupled from the respective lens to the respective coupler.

* * * * *